(12) United States Patent
Hiraguchi et al.

(10) Patent No.: US 6,866,215 B1
(45) Date of Patent: Mar. 15, 2005

(54) MAGNETIC TAPE CASSETTE

(75) Inventors: Kazuo Hiraguchi, Kanagawa (JP); Shozo Onmori, Kanagawa (JP); Teruo Ashikawa, Kanagawa (JP); Atusi Takano, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/979,011

(22) PCT Filed: May 16, 2000

(86) PCT No.: PCT/JP00/03136
§ 371 (c)(1),
(2), (4) Date: Nov. 15, 2001

(87) PCT Pub. No.: WO00/70616
PCT Pub. Date: Nov. 23, 2000

(30) Foreign Application Priority Data

May 18, 1999 (JP) ............................ 11/137406

(51) Int. Cl.$^7$ ............................................. G11B 23/04
(52) U.S. Cl. .................................... 242/347.1; 360/132
(58) Field of Search ......................... 242/347.1; 360/132

(56) References Cited

U.S. PATENT DOCUMENTS

| | | | | |
|---|---|---|---|---|
| 4,897,751 A | * | 1/1990 | Goto | ........................... 360/132 |
| 5,308,014 A | * | 5/1994 | Honsho et al. | .......... 242/347.1 |

FOREIGN PATENT DOCUMENTS

EP          0 720 163 A       7/1996

* cited by examiner

Primary Examiner—John Q. Nguyen
(74) Attorney, Agent, or Firm—Sughrue Mion, PLLC

(57) ABSTRACT

At both sides of an opening of a cassette case, there are formed tape guides having guide faces, and a magnetic tape is stretched between the guide faces. On back faces of the guide faces of the tape guides, are formed cam grooves for guiding an open/close lid which covers the stretched magnetic tape. The open/close lid includes an inner lid provided with slide pins projected from both ends thereof and adapted to be slidably engaged with the cam grooves. An upper cassette half includes position regulating member adapted to be abutted by the slide pins in a state where said open/close lid is fully opened.

7 Claims, 29 Drawing Sheets

MAGNETIC TAPE CASSETTE

FIELD OF THE INVENTION

The present invention relates to a magnetic tape cassette such as digital video cassette (DVC).

BACKGROUND OF THE INVENTION

With a technical revolution in recent years that high density of magnetic recording medium has been realized, the magnetic tape cassettes and video tape recorders (VTR) have become compact. There are many occasions where the VTR is used outdoors to take pictures of landscapes and portraits. In order to obtain dust proofing property enough to withstand such outdoor uses, some magnetic tape cassettes have lids of two panel type or three panel type for covering a front face and a back face of the magnetic tape. There are various types of the magnetic tape cassettes and, the DVC for example includes a small size (S type), a medium size (M type), and a large size (L type).

FIG. 23 is an exploded perspective view of the DVC of the M type provided with the lid of three panel type. A cassette case of this magnetic tape cassette 310 is composed of an upper cassette half 311 and a lower cassette half 312 each of which includes a flat plate and upright walls surrounding the flat plate.

The flat plate of the lower cassette half 312 is formed with reel holding holes 313 on which a pair of reels 319 are mounted having a magnetic tape T wound around them. Reel driving shafts provided in a hardware such as VTR and so on are adapted to be inserted into the reel holding holes 313. At a center of a forward end of the cassette case (a side opposed to a head of the hardware when the magnetic tape cassette has been loaded in the hardware), there is formed an opening 314. The flat plate of the lower cassette half 312 is provided with tape guides 318 at both sides of the opening 314. The surrounding walls of the lower cassette half 312 are provided with cutouts 317 for enabling the magnetic tape T which is wound around the reels 319 to pass into and out from the opening 314 at the other sides of the tape guides 318 opposite to the opening 314. At a center of a forward end of the flat plate of the lower cassette 312 and behind the opening 314, there is provided a central part 315 of a front wall which projects toward the upper cassette half 311. The flat plate of the lower cassette half 312 is further provided, at both sides of the central part 315, with lower walls 315a which constitute both side parts of the front wall in combination with upper walls 315b of the upper cassette half 311. The opening 314 is defined by this front wall and the tape guides 318.

To the cassette case composed of the upper cassette half 311 and the lower cassette half 312 assembled together, is attached an open/close lid 320 so as to cover the magnetic tape T which is stretched between the tape guides 318 (over the opening 314). This open/close lid 320 consists of an outer lid (a front lid) 321, a top lid (an upper lid), and an inner lid (a back lid) 323.

The outer lid 321 includes a front lid plate 321a covering a front face of the magnetic tape T which is stretched over the opening 314, and side plates 321b which extend backward from both sides of the front lid plate 321a. Pivotal pins 321c having distal end flanges are provided so as to project from inner faces of the side plates 321b. These pivotal pins 321c are rotatably held by pin holding cutouts 324a which are formed in pin supporting pieces 338a provided at front sides of both lateral walls 311a of the upper cassette half 311. The pivotal pins 321c are rotatably engaged and held in pin holding holes which are defined by the pin holding cutouts 324a in the pin supporting pieces 338a of the upper cassette half 311 and by pin supporting pieces 338b of the lower cassette half 312. The outer lid 321 can rotate around the pivotal pins 321c. The outer lid 321 is always urged by a lid spring 327 in a closing direction.

The top lid 322 includes an upper lid plate 322a covering an upper edge of the magnetic tape T which is stretched over the opening 314, and side plates 322b which extend downward from both sides of the upper lid plate 322a. At forward sides of inner faces of the side plates 322b, there are provided front lid connecting pins 322c adapted to rotatably connect the upper lid plate 322a to connecting holes 321d of the front lid plate 321a. At backward sides of the inner faces of the side plates 322b, there are provided slide pins 322d which are adapted to be slidably engaged with cam grooves 325 for the upper lid which are formed in both side walls 311a of the upper cassette half 311. When the outer lid 321 is opened, the top lid 322 moves backward of the cassette case while the slide pins 322d are moved along the cam grooves 325 for the upper lid, and the upper lid plate 322a is maintained in substantially parallel to an upper face of the cassette.

The inner lid 323 includes a back lid plate 323a covering a back face of the magnetic tape T which is stretched over the opening 314. From both ends of an upper edge of the back lid plate 323a, are projected upper lid connecting pins 323b adapted to rotatably connect the back lid plate 323a to the upper lid plate 322a. From both ends of a lower edge of the back lid plate 323a, are projected slide pins 323c adapted to be slidably engaged with S-shaped cam grooves 326 for the inner lid which are formed on opposed faces (inner faces) of a pair of the tape guides 318 provided on the lower cassette half 312. The upper lid connecting pins 323b follow the movement of the top lid 322 when the outer lid 321 is opened. Along with the movement of the upper lid connecting pins 323b, the slide pins 323c are caused to slide inside the cam grooves 326 for the inner lid.

When this magnetic tape cassette 310 has been loaded in the hardware, the side plates 321b of the outer lid 321 are pushed upward against an urge of the lid spring 327 by means of lid opening pins (not shown) provided on the hardware. In association with the lid opening motion of the outer lid 321, on this occasion, the top lid 322 and the inner lid 323 perform their lid opening motions. When the magnetic tape cassette 310 has been taken out from the hardware, the lids 321, 322 and 323 will perform the lid closing motions by the urge of the lid spring 327.

FIG. 24 is an enlarged view showing an area around the tape guides 318. As shown in FIG. 24, on an inner face of one of the tape guides 318 which is opposed to the other tape guide (not shown), there is formed the cam groove 326 for the inner lid in which the slide pin 323c of the aforesaid inner lid 323 is adapted to slide. Also on the inner face of the tape guides 318, there is provided a projection 328 which is formed with a position detecting hole (a reference hole) of the magnetic tape cassette.

By the way, the upper cassette half 311 and the lower cassette half 312 of this magnetic tape cassette are formed by injection molding. In order to prevent occurrence of molding sinks on a guide face 318a of the tape guide 318 on occasion of the injection molding, molding sink preventing recesses must be formed on a back face (the inner face) 318b of the guide face 318a. In the tape guide 318 having such a shape as shown in FIG. 24, a molding sink preventing recess 329a is formed in an area of the back face 318b of the tape guide 318 in front of the cam groove 326 for the inner lid (outside of the cassette case). Also in an area of the back face 318b in rear of the cam groove 326 for the inner lid (inside of the cassette case) and above the projection 328 formed with the position detecting hole 328a, there is formed a molding sink preventing recess 329b. Still further, in an area of the back face 318b of the tape guide 318 in rear of the cam groove 326 for the inner lid and in front of the projection 328 formed with the position detecting hole 328a, there is formed a molding sink preventing recess 329c.

Because of existence of the three molding sink preventing recesses and the cam groove 326 for the inner lid as described above, high friction resistance will be created in molds slide cores) for forming these three molding sink preventing recesses and the cam groove 326 for the inner lid, when they slide. In a manufacturing process of the lower cassette half 312, a number of the lower cassette halves must be molded by employing these slide cores, and therefore, the slide cores will be subjected to the high friction resistance repeatedly. It has been found that these repeated loads lead to the following problems of the slide cores.

FIG. 25 is a sectional view taken along a line A—A of FIG. 24 showing a slide core 390 for forming the molding sink preventing recesses and the cam groove 326 for the inner lid. Among the molding sink preventing recesses, the molding sink preventing recess 329c is small in size. As shown in FIG. 25, a portion 390c of the slide core 390 adapted to form the molding sink preventing recess 329c is narrow and long. Accordingly, the portion 390c of the slide core 390 adapted to form the molding sink preventing recess 329c tends to be broken at a root 390r, and has extremely low durability. When the portion 390c of the slide core 390 adapted to form the molding sink preventing recess 329c has been broken, the broken portion 390c will hinder motions of the mold, and the broken mark of the mold will be transferred to an area of the tape guide 318 to be formed with the molding sink preventing recess 329c, thus resulting in bad outer appearance.

A first object of the present invention is to provide a magnetic tape cassette in which durability of the molds can be enhanced.

FIG. 26A is a sectional view of an essential part of the above described upper cassette half 311 taken along a center line in a longitudinal direction. FIG. 26B is a sectional view of an essential part of the above described lower cassette half 312 taken along a center line in a longitudinal direction. As shown in FIG. 26A, the upper cassette half 311 is provided with an upper lid 330 above a tape running area. In areas of the upper cassette half 311 adjacent to the opening 314, there are provided cam covers 331 in a shape of flat plate which will prevent the slide pins 323c of the inner lid 323 from moving upward out of the cam grooves 326 for the inner lid. In areas of the cam covers 331 adjacent to the opening 314, there are respectively formed the upper walls 315b which constitute both the side parts of the front wall of the cassette case in combination with the lower walls 315a of the lower cassette half 312. The upper walls 315b are provided with projections 332 formed with respective positioning reference holes 332a so as to project forward.

Meanwhile, as shown in FIG. 26B, the lower walls 315a of the lower cassette half 312 are also provided with the projections 328 formed with the reference holes 328a so as to project forward near the cam grooves 326 for the inner lid. These projections 328 are in contact with the back faces 318b of the tape guides 318 too.

In order to assemble the magnetic tape cassette 310 employing the open/close lid 320 of the three panel type as shown in FIG. 23, the outer lid 321, the top lid 322 and the inner lid 323 are temporarily assembled in advance. Then, the temporarily assembled three lids 321, 322, 323 are assembled to the upper cassette half 311, by engaging the slide pins 322d of the top lid 322 in the cam grooves 325 for the upper lid formed in the upper cassette half 311, and at the same time, by engaging the pivotal pins 321c of the outer lid 321 with the pin holding cutouts 324a formed in both the side walls 311a of the upper cassette half 311. Then, as shown in FIG. 27, the upper cassette half 311 is assembled to the lower cassette half 312 which has been placed on a support table in a state where the open/close lid 320 is fully opened.

By the way, when the upper cassette half 311 is assembled to the lower cassette half 312 through manual operation, there may be some occasions where the upper cassette half 311 is happened to be assembled to the lower cassette half 312 while the upper cassette half 311 is not in parallel to a support face of the lower cassette half 312. In this case, because the inner lid 323 is rotatably connected to the top lid 322 only by means of the upper lid connecting pins 323b, the inner lid 323 often tends to be displaced from a proper position around the upper lid connecting pins 323b. As the results, the slide pins 323c of the inner lid 323 are moved and cannot be inserted into the cam grooves 326 for the inner lid, so that the upper cassette half 311 may not be accurately assembled to the lower cassette half 312.

A second object of the present invention is to provide a magnetic tape cassette in which assembling performance of the open/close lid can be enhanced.

As shown in FIG. 23, lock projections 321e are provided so as to project from the inner faces of the side plates 321b of the outer lid 321. To both side walls of the lower cassette half 312, are rotatably fastened lid lock members 335a, 335b which are adapted to be engaged with these lock projections 321e to lock the open/close lid 320 in the closed state. One of the lid lock members 335a is urged by the lid spring 327 mounted on the pivotal pin 321c of the outer lid 321 in a direction of locking (a locking direction) the open/close lid 320. The other lid lock member 335b is urged in a locking direction by a lid lock spring 334 which is assembled to the lower cassette half 312.

FIG. 28 is a view showing an outer face of the side walls of the cassette case. The outer lid 321 includes the front lid plate 321a covering the front face of the magnetic tape T which is stretched over the opening 314, and the side plates 321b extended from both sides of the front lid plate 321a. The pivotal pins 321c having the distal end flanges 333 are provided on the inner faces of the side plates 321b perpendicularly to the inner faces. The pivotal pins 321c are rotatably engaged and supported in the pin holding holes 324 which are defined by the pin supporting pieces 338a of the upper cassette half 311 and the pin supporting pieces 338b of the lower cassette half 312. The outer lid 321 can rotate around the pivotal pins 321c.

The lid spring 327 is mounted on the side plate 321b of the outer lid 321. The lid spring 327 includes a multiplied coil portion 327c which is idly mounted around the pivotal pin 321c, one leg portion 327a which is locked on a spring hook projection 336 provided on the side plate 321b, and the other leg portion 327b which is locked on a spring hook projection 337 provided on the side wall of the upper cassette half 311. In other words, the lid spring 327 is locked with the side plate 321b of the outer lid 321 at its one leg portion 327a, and locked with the side wall of the upper cassette half 311 at its other leg portion 327b. With biasing force in a direction toward a bottom face of the cassette (a direction D) generated by the leg portions 327a, 327b of this lid spring 327, the outer lid 321 is urged in a closing direction (a direction C). Meanwhile, the leg portion 327b of the lid spring 327 is engaged with an upper face of the lid lock member 335a (See FIG. 23) from a side of the upper cassette half 311 thereby to urge the lid lock member 335a in a locking direction.

When the open/close lid 320 is opened or closed, the slide pins 323c of the inner lid 323 are guided by the cam grooves 326 for the inner lid which are formed on the tape guides 318 of the lower cassette half 312 so as to move the inner lid 323 along the inner faces 318b of the tape guides 318 as shown in FIG. 29. An upward movement of the inner lid 323 will be restrained by the cam covers 331 which are provided on the upper cassette half 311.

However, since the upper cassette half 311, the lower cassette half 312, and the lids are separately molded, there exist manufacturing errors between the components. In case where the inner lid 323 is offset to one side due to a manufacturing error when assembled, a portion of the inner face 318b (an area having a knitted pattern) of each of the tape guides 318 interferes with the side face of the inner lid 323. This will hinder smooth opening and closing motions of the open/close lid, and an occurrence of abrasion powder by the interference will result in errors such as a drop out and so on. Moreover, a force for opening and closing the open/close lid may rise with the interference, or the force for opening and closing the open/close lid may vary with the interference.

A third object of the present invention is to provide a magnetic tape cassette in which opening and closing motions of the open/close lid can be performed smoothly, and errors such as a drop out and so on can be prevented, and damage caused by a shock of falling down can be reduced.

By the way, the spring hook projection 336 provided on each of the side plates 321b of the outer lid 321 as shown in FIG. 28 also moves at the opening and closing motions of the open/close lid. FIG. 30 is a view showing the front side of the magnetic tape cassette 310 partly cut away. The spring hook projection 336 moves along an outer face 339a of the pin supporting piece 338a of the upper cassette half 311, and along an outer face 339b of the pin supporting piece 338b of the lower cassette half 312. These outer faces 339a, 339b of the pin supporting pieces 338a, 338b are preferably flush with each other so that they may not make obstacles to the opening and closing motions of the open/close lid.

However, because the upper cassette half 311 and the lower cassette half 312 are separately molded and assembled, these outer faces 339a, 339b of the pin supporting pieces 338a, 338b are not always made flush, but in some cases, a step-like difference E may be formed between these outer faces as shown in FIG. 31. It is difficult to completely eliminate this step-like difference E from a reason of molding work. Since the spring hook projection 336 interferes with the step-like difference E, the spring hook projection 336 will not move linearly, but move as shown by crooked arrow marks O and C in FIG. 31. This will hinder smooth opening and closing motions of the open/close lid 320, and an occurrence of abrasion powder by the interference will result in errors such as a drop out and so on. Moreover, a force for opening and closing the open/close lid may rise with the interference, or the force for opening and closing the open/close lid may vary with the interference.

A fourth object of the present invention is to provide a magnetic tape cassette in which opening and closing motions of the open/close lid can be performed smoothly, and errors such as a drop out and so on can be prevented.

As shown in FIG. 23, in order to confirm from the exterior an amount of the magnetic tape T wound around one of the reels 319, there is formed an opening which extends in a lateral direction of the flat plate of the upper cassette half 311 at one side in a longitudinal direction (aright side in the drawing) of the flat plate. A transparent window member 340 is attached to the upper cassette half 311 so as to cover the opening.

The cam groove 326 for the inner lid which is provided on each of the tape guides 318 is formed in a curved shape at its front side and in a shape of a straight line at its back side as shown in FIG. 32, so that it may not hinder the smooth opening and closing motions of the outer lid 321. As the open/close lid 320 is gradually opened from a state in FIG. 32, the front side of the top lid 322 supported by the outer lid 321 will be raised drawing a circular orbit, and at the same time, the back side of the top lid 322 will be raised along an arc shaped portion at the front side of the cam groove 325 for the upper lid with which the slide pin 322d is engaged. As the outer lid 321 rotates into a state where it has rotated about 90 degree (an open state), the front side of the top lid 322 will be raised rectilinearly, and the back side of the top lid 322 is moved along the straight portion at the back side of the cam groove 325 for the upper lid. In this manner, the top lid 322 moves backward of the cassette case as shown in FIG. 33, while the upper lid plate 322a is maintained in parallel to the upper face of the cassette and the slide pin 322d is not caught by the cam groove 325 for the upper lid.

However, while the opening and closing motions of the open/close lid 320 are repeated, abrasion may occur between the cam groove 325 for the upper lid and the slide pin 322d of the top lid 322. Conventionally, a width of the cam groove 325 for the upper lid has been made constant from the curved portion to the straight portion so as to smoothly guide the slid pin 322d inside the cam groove 325 for the upper lid. A gap between the cam groove 325 for the upper lid and an outer peripheral face of the slide pin 322d has been conventionally set to be 0.1 mm so that the slide pin 322d may not rattle in the cam groove 325 for the upper lid. Nevertheless, abrasion has occurred between the cam groove 325 for the upper lid and the slide pin 322d. Abrasion powder generated from the abrasion will be a cause of the drop out and so on.

A fifth object of the present invention is to provide a magnetic tape cassette which is free from abrasion between the cam grooves and the slide pins.

As shown in FIG. 23, an ID board 350 which is an electric circuit board of a slim type is incorporated in the magnetic tape cassette 310. In such a small sized product as this magnetic tape cassette 310 which incorporates electric circuits, a thin mounting board which requires less occupying space is employed as the electric circuit board.

The ID board 350 is a component for identifying kind and use of the magnetic tape T. The ID board 350 is assembled to a corner area at the back side of the lower cassette half 312. According to cases, an ID board incorporating an integrated circuit (IC) for storing managing information of recorded contents, which may be called as an IC board, may be assembled. FIG. 34 is an enlarged view of a structure of the ID board 350 to be assembled to the lower cassette half 312. the ID board 350 has a board plate 350a formed in a substantially L-shape. There are provided electrical contacts (plated terminals) 351*a*, 351*b*, 351*c* and 351*d* in a rectangular shape on a back face (a face in the depth in the drawing) of the board plate 350*a*. On, the other hand, on a front face (a face in the front in the drawing) of the board plate 350*a*, there are provided chip resistors 353*a*, 353*b*. The board plate 350*a* is provided with through holes 352. The electrical contacts 351*a* to 351*d* on the back face of the board plate 350*a* and the chip resistors 353*a*, 353*b* on the front face of the board plate 350*a* are electrically connected by way of a printed wiring 354.

A space for containing the ID board is formed at a position in the lower cassette half 312 adjacent to the back wall. The back wall is provided with openings 312*a* which are defined by frames, at positions corresponding to the contacts 351*a* to 351*d* on the back face of the ID board 350. When the ID board 350 has been assembled in the ID board containing space, the contacts 351*a* to 351*d* are respectively exposed to the exterior of the cassette case through the openings 312*a*.

When the magnetic tape cassette provided with the ID board has been loaded in a hard ware which is not shown, terminals of the hardware get in touch with the contacts 351*a* to 351*d* on the back face of the ID board 350 and read out resistance values between the determined two contacts. On the basis of these resistance values, the hardware identifies the type and use of the magnetic tape. Similarly, when the magnetic tape cassette provided with the IC board has been loaded in the hardware, although not shown, terminals of the hardware get in touch with the contacts on the back face of the IC board to provide required information to the hardware.

By the way, the thin and small mounting board is generally manufactured, for the purpose of saving manufacturing cost, by making a plurality of electric circuits having the same structure on a large sized board sheet, and then, by dividing the board sheet. A plurality of the ID boards 350 can be taken out from an ID board sheet 360 as shown in FIG. 35. This ID board sheet 360 can provide 54 pieces of the ID board 350. Each of the ID boards 350 is connected to connecting members 361 at two or three positions of an outer circumference of the ID board.

Steps of taking a plurality of the ID boards 350 from this ID board sheet 360 will be described. As a first step, the ID board sheet 360 is carried to a mounting section which is not shown, with the face having the contacts 351*a* to 351*d* directed downward, and the determined chip resistors are mounted on its upper face, that is, a face opposite to the face provided with the contacts 351*a* to 351*d*.

Then, the ID board sheet 360 is carried to a measuring section which is not shown, in a state where the face having the contacts 351*a* to 351*d* is still directed downward. Then, measuring terminals are brought in touch with the contacts 351*a* to 351*d* from the underneath of the ID board sheet 360, thus measuring resistance between the two determined contacts.

Then, the ID board sheet 360 is carried to a press section which is not shown, in a state where the face having the contacts 351*a* to 351*d* is still directed downward, and a cutting edge is applied to the ID board sheet 360 from the above of the relevant ID board sheet to cut off the ID boards 350 from the connecting members 361.

Recently, in order to improve productivity of the slim electric circuit board, it has been desired to obtain the board sheet having a further large size, and to cut off a large number of slim boards of electric circuits at one time. For example, in the above described ID board for the magnetic tape cassette, it is sometimes required that 100 to 200 pieces of the ID boards are taken from a sheet of the ID board sheet. However, as a result of upsizing the ID board sheet, it is feared that the ID board sheet may be deflected during the transfer to the press section, and flat ID boards cannot be obtained in the press section.

In this situation, it has been considered that the chip resistors are mounted in a state where a reinforcing plate is attached to the back face of the ID board sheet 360 (the face provided with the contacts 351*a* to 351*d*). However, when such reinforcing plate has been employed, the contacts on the ID board sheet are covered with the reinforcing plate, and cannot get in touch with the measuring terminals in the measuring section.

Moreover, in the conventional steps of taking the ID board 350 from the ID board sheet 360, the measuring terminals have been abutted against the contacts of the relevant ID board sheet from below of the ID board sheet 360. However, in order to support the ID board sheet so as to permit the access of the measuring terminals from the below, a complicated mechanism has been required. Therefore, it has been considered that the ID board may be turned upside down while it is carried to the measuring section, which however, would incur a further complication of the mechanism.

A sixth object of the present invention is to provide a magnetic tape cassette which is provided with a slim electric circuit board of which productivity can be improved.

DISCLOSURE OF THE INVENTION

The first object of the invention is attained by a magnetic tape cassette comprising a pair of tape guides having guide faces which are provided at both sides of an opening formed at a front side of a cassette case, a magnetic tape being stretched between the guide faces at the opening, cam grooves for guiding an open/close lid so as, to cover the stretched magnetic tape formed on back faces of the guide faces, and projections having position detecting holes provided in respective positions in lower parts of the back faces and backward of the cam grooves, characterized in that there are formed molding sink preventive recesses only at positions forward of the cam grooves on the back faces, and at positions backward of the cam grooves on the back faces and above the projections.

It has been found, as a result of an intensive study of the inventors, that molding sinks will hardly occur in fact, even though the molding sink preventive recesses having a small opening area are not provided at positions backward of the cam grooves on the back faces of the tape guides and above the projections formed with the position detecting holes.

According to the magnetic tape cassette of the invention, in molds for forming molding sink preventive recesses on the back faces of the tape guides, the portions having a small sectional area have been omitted. Accordingly, there will be no fear of damaging the molds, and durability of the molds can be enhanced.

In this invention, each of the cam grooves has preferably an S-shape. In addition, a lower curved part of the cam groove having the S-shape is preferably extended up to a position below an upper face of the projection. In this manner, an area of the backward part of the back face which has been divided by the cam groove is decreased, and occurrence of the molding sinks can be more reliably prevented.

The above described second object of the invention is attained by a magnetic tape cassette comprising a cassette case including an upper and a lower cassette halves and provided with an opening at a front side, and an open/close lid for covering a magnetic tape stretched at the opening, the open/close lid including an inner lid adapted to cover a back face of the magnetic tape, slide pins projected from both ends of a lower edge of the inner lid being slidably engaged with cam grooves for the inner lid formed in the lower cassette half, characterized in that the upper cassette half is provided with position regulating means which are adapted to be abutted by the slide pins in a state where the open/close lid is fully opened.

According to the magnetic tape cassette of the invention, when the upper cassette half is assembled to the lower cassette half, in the fully opened state of the open/close lid, the position regulating means provided on the upper cassette half are abutted against the slide pins of the inner lid. Positioning of the inner lid can be made with reference to the abutting position, and so, the slide pins of the inner lid can be reliably inserted into the cam grooves for the inner lid in the lower cassette half. Assembling workability of the open/close lid can be thus enhanced.

In the invention, the faces of the position regulating means to be abutted by the slide pins are preferably positioned forward of upper end walls of the cam grooves for the inner lid. In addition, the faces of the position regulating means to be abutted by the slide pins are preferably positioned substantially on a same plane as a plane parallel to a vertical direction of the cassette case, which includes a center line of position detecting holes provided in the lower cassette half.

The third object of the invention is attained by a magnetic tape cassette comprising a cassette case including an upper and a lower cassette halves and provided with an opening at a front side, a pair of tape guides formed in the lower cassette half at both sides of the opening, and an open/close lid for covering a magnetic tape stretched between the tape guides, the open/close lid including an inner lid adapted to cover a back face of the magnetic tape, the inner lid being provided with slide pins projected from both ends thereof and adapted to be slidably engaged with cam grooves for the inner lid formed on inner faces of the tape guides, the upper cassette half being provided with cam covers at a front edge thereof projected forward so as to be positioned above the cam grooves for the inner lid, characterized in that the cam covers are provided with protrusions at their inner base parts.

According to the magnetic tape cassette of the invention, the side faces of the inner lid are guided along the protrusions of the cam covers, on occasion of opening and closing the open/close lid. In short, a space is ensured between the side faces of the inner lid making the opening and closing motions and the tape guides. As the results, the inner lid will be prevented from interfering with the tape guides, the opening and closing motion of the open/close lid can be smoothly performed, and occurrence of an error such as a dropout and so on due to abrasion powder can be avoided.

Further, in a state where the open/close lid is completely closed, the upper edge of the inner lid will not be held by the protrusions, so that the side faces of the inner lid are apart from the tape guides and the inner lid is made free. When the magnetic tape cassette has accidentally fallen down, an outer force can be received by the entire surface of the side faces of the inner lid, and it can be avoided that the inner lid partially receives an intensive load. As the results, damage of the magnetic tape cassette due to a shock or the like can be eliminated.

The fourth object of the invention is attained by a magnetic tape cassette comprising a cassette case including an upper and a lower cassette halves and provided with an opening at a front side, an open/close lid for covering a magnetic tape stretched at the opening, lid lock members adapted to be engaged; with lock projections provided on side plates of the open/close lid to lock the open/close lid in a closed state, and a lid spring for urging the open/close lid in a closing direction and for urging one of the lid lock members in a locking direction, pivotal pins provided on the side plates of the open/close lid being rotatably supported by pin supporting pieces provided on side walls of the upper and lower cassette halves, the lid spring including a coil portion to be mounted on one of the pivotal pins, one leg portion to be locked on a spring hook projection provided on the side plate, and the other leg portion to be locked on a spring hook projection provided on the side wall of the upper cassette half, wherein the other leg portion urges the lid lock member in the locking direction, characterized in that on each side of the cassette case, a lower end of an outer face of the pin supporting piece of the upper cassette half is positioned inward of an outer face of the pin supporting piece of the lower cassette half, and an upper end of the outer face of the pin supporting piece of the upper cassette half is positioned outward of the outer face of the pin supporting piece of the lower cassette half.

According to the magnetic tape cassette of the invention, an interference between the spring hook projection and the pin supporting piece can be reliably prevented. Therefore, the opening and closing motion of the open/close lid can be smoothly performed, and occurrence of an error such as a dropout and so on due to abrasion powder can be avoided.

In the invention, the outer face of the pin supporting piece of the upper cassette half is preferably an inclined face of a flat plane having a constant gradient.

It is also considered as a measure for eliminating the interference between the spring hook projection and the pin; supporting piece, that the pin supporting piece of the upper cassette half is extended toward the lower cassette half. However, this measure is unfavorable, because the extended pin supporting piece will hinder the open/close lid from being accurately assembled to the cassette case.

The fifth object of the invention is attained by a magnetic tape cassette comprising a cassette case which rotatably contains a pair of reels around which a magnetic tape is wound, an open/close lid attached to the cassette case so as to cover the magnetic tape, cam grooves having curved portions and provided at both sides of the cassette case so as to guide slide pins which are projected from both sides of the open/close lid, and a biasing member located near one of the cam grooves for urging the open/close lid in a closing direction, characterized in that a gap between an inner face of the curved portion of one of the cam grooves and an outer peripheral face of the slide pin is different from a gap between an inner face of the curved portion of the other of the cam grooves and the outer peripheral face of the slide pin.

The inventors have found, as a result of their intensive study, that, of the cam grooves provided at the both sides of the upper cassette half, in the cam groove which is not provided with the lid spring, the slide pin tends to swing when the top lid is opened.

In the cam groove which is provided with the lid spring, the slide pin of the top lid is urged by the lid spring by way of the outer lid, and the slide pin will not easily rattle. In other words, a gap between the cam groove and the slide pin has become substantially narrower than a designed size. Therefore, in case where the size of the cam grooves at the both sides of the upper cassette half and the size of the slide pins at the both sides of the top lid are designed to be the same, the actual gaps between the cam grooves and the slide pins will be different at both sides, since a position of the outer lid is restrained in a determined direction when the pivotal pins have been rotatably engaged with the pin holding cutouts provided at both sides of a forward part of the upper cassette half. In the cam groove which is not provided with the lid spring, when the top lid is opened, that is, when the slide pin moves along the curved portion of the cam groove, the slide pin swings to be abutted against an inner face of the cam groove, since the slide pin is less restrained from the movement than the slide pin at the side having the lid spring. This has been a cause of an increase of the friction resistance.

In view of the circumstances, the inventors have come to a concept that the designed size of the cam grooves at the both sides of the upper cassette half and the designed size of the slide pins at the both sides of the top lid should be set considering the actual gap between the cam groove and the slide pin.

According to the magnetic tape cassette of the invention, occurrence of abrasion powder caused by the interference between the cam grooves of the cassette case and the slide pins of the open/close lid can be reliably prevented, and a dropout, etc. will not occur.

The sixth object of the invention is attained by a magnetic tape cassette comprising an electric circuit board incorporated therein, the electric circuit board having a base plate provided on its one face with first contact parts consisting of electric contacts exposed to the exterior, and on its other face with circuit elements electrically connected to the first contact parts by way of a wiring, characterized in that the other face of the base plate is provided with second contact parts consisting of electric contacts electrically connected to the wiring and exposed to the exterior.

Shape of the second contact parts is not restricted. For example, plated terminals of a circular shape and a rectangular shape can be adopted. The base plate having a thickness of about 0.2 mm to 0.8 mm can be employed. As the circuit elements, the chip resistors and IC can be exemplified.

According to the magnetic tape cassette of the invention, in the process of taking a plurality of electric circuit boards from a large size board sheet, a prescribed measurement can be done by means of the second contacts which are provided on the side carrying the circuit elements. Moreover, in both the measuring process and the press process, measuring terminals and cutting means such as cutting edges can be respectively moved in the same direction to be abutted against the electric circuit board. Therefore, manufacturing system can be simplified, and upsizing of the board sheet become possible thus enhancing productivity of the electric circuit board.

BEST MODE FOR CARRYING OUT THE INVENTION

Figure 1:
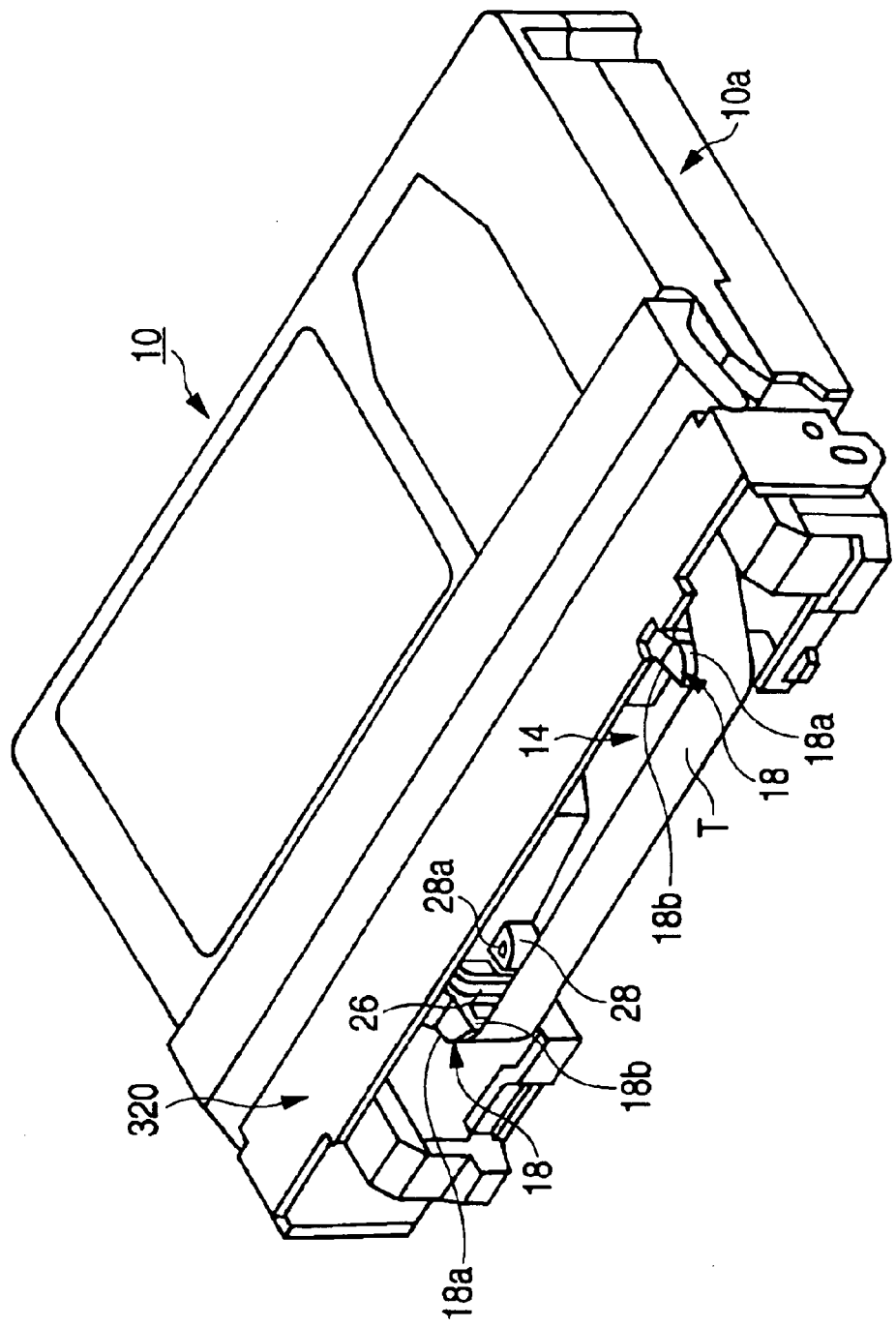
FIG. 1 is a perspective view of a magnetic tape cassette of a first embodiment according to the invention.

Now, embodiments of the invention will be described referring to the drawings. Components having similar structures and operation to those components which have been already described will be denoted with the same or corresponding reference numerals, and their explanation will be simplified or omitted.

FIG. 1 shows a magnetic tape cassette in a first embodiment according to the invention. A magnetic tape cassette 10 is provided, in a center part of a front side of a cassette case 10a (a side opposed to a head of a hardware such as VTR when the magnetic tape cassette has been loaded in the hardware), with an opening 14 through which a tape withdrawing member of the hardware is adapted to be inserted. There are formed tape guides 18, 18 at left and right sides of the opening 14. Each of the tape guides 18, 1B in this embodiment has a curved face which is continuously formed from its outer face to a front face. This curved face defines a guide face 18a. A magnetic tape T is stretched between the guide faces 18a, 18a of the tape guides 18, 18, and exposed from the cassette case 10a through the opening 14. On a back face 18b (an inner face of the tape guide) of the guide face 18a of one of the tape guides 18 which is a face opposed to the other tape guide 18, there is formed an S-shaped cam groove 26 for an inner lid. The cam groove 26 is adapted to guide opening and closing motions of the open/close lid 320. The open/close lid 320 is adapted to cover and expose the magnetic tape T at the opening 14 with the opening and closing motions thereof.

Figure 2:
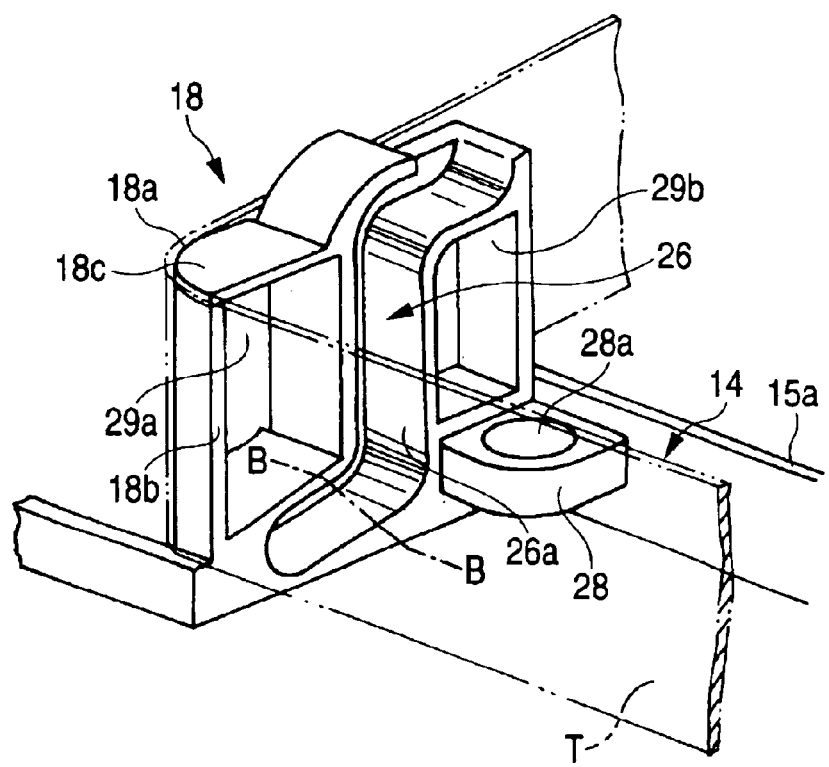
FIG. 2 is a perspective view showing a tape guide in the first embodiment.

As shown in FIG. 2, a projection 28 provided with a detecting hole 28a which serves as a positioning reference of the magnetic tape cassette is projected from a back face 18b of the tape guide 18 in a boundary area with respect to a front wall (a lower wall) 15a of the cassette case.

The cam groove 26 formed on the back face 18b of the tape guide 18 has an S-shape so that the back face 18b may be substantially divided in a vertical direction. In this embodiment, a lower curved part 26a of the cam groove 26 is extended up to a position below an upper face of the projection 28. The lower curved part 26a extends forwardly.

On the back face 18b of the tape guide 18, molding sink preventive recesses 29a, 29b are respectively formed only at a forward position of the back face 18b which is divided by the cam groove 26, and at a backward position of the back face 18b which is divided by the cam groove 26 and above the projection 28. The tape guide 18 is provided with a top plate 18c.

Figure 3:
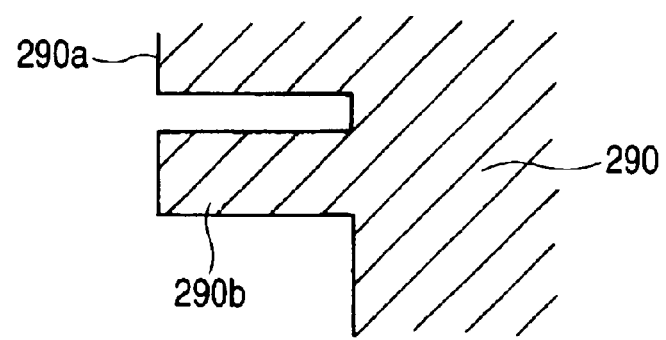
FIG. 3 is a sectional view showing a mold for injection molding of a part including a line B—B in FIG. 2.

As shown in FIG. 3, a slide core 290 for forming by injection molding the back face 18b of the tape guide 18 has a portion 290a adapted to form the molding sink preventive recess 29a and a portion 290b adapted to form the cam groove 26. There is no such portion in the slide core 290 as having a small sectional area and being fragile.

Figure 4:
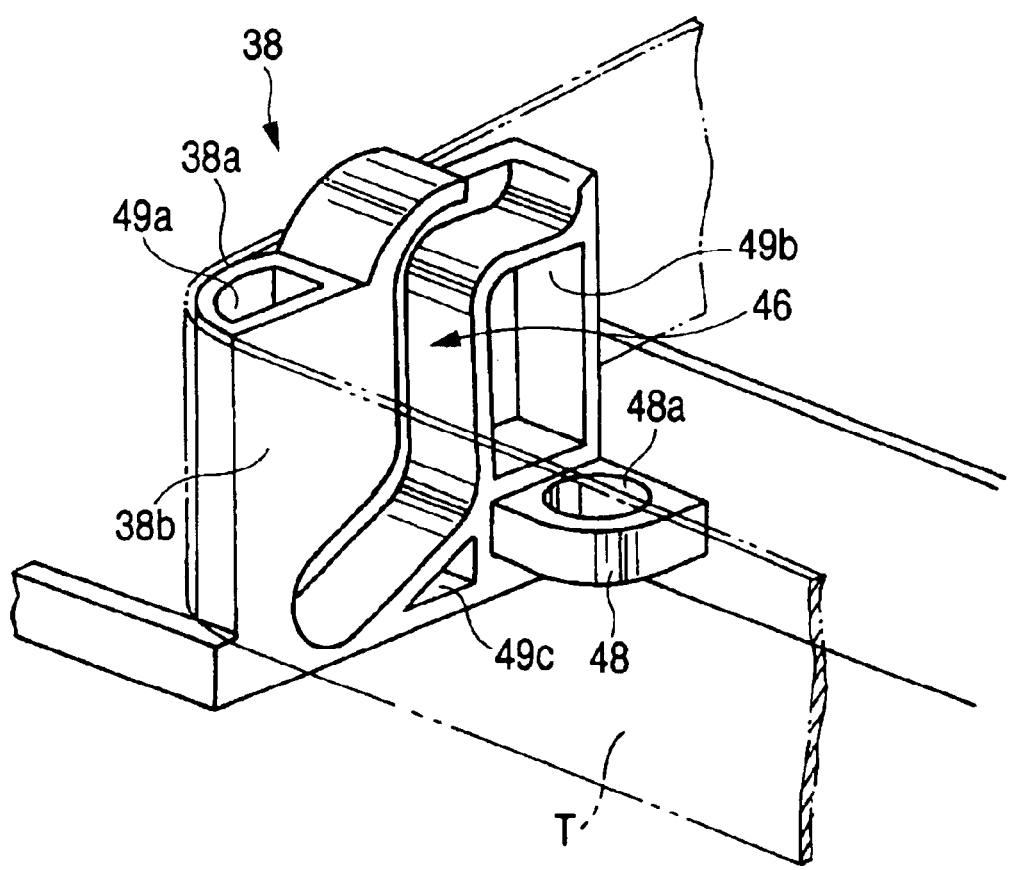
FIG. 4 is a perspective view of the tape guide in a modified example of the first embodiment.

Although the tape guide 18 is provided with the top plate 18c in the above described embodiment, in some cases, a tape guide 38 having no top plate may be employed for the reason of design as shown in FIG. 4. In this tape guide 38, a molding sink preventive recess 49a which is formed forward of a cam groove 46 is open in an upper face 38a of the tape guide 38 but not in the back face 38b. Even though this tape guide 38 is formed with a molding sink preventive recess 49c having a small opening area, by means of a slide core, at a backward position of the cam groove 26 and in front of the projection 48, there will occur no problem of damaging the mold, because all friction resistance exerted on the slide core has been decreased. However, it is of course possible to omit the molding sink preventive recess 49c. Whether the molding sink preventive recess 49c should be omitted or not may be determined by comparing and considering the problem of the molding sinks and durability of the mold.

It is to be noted that in an ordinary 8 mm cassette, the projection provided with the detecting hole does not exist at the same position as in the above described embodiment. As the result, the molding sink preventive recess will not be so small, and the problem of damaging the mold will not occur.

Figure 5:
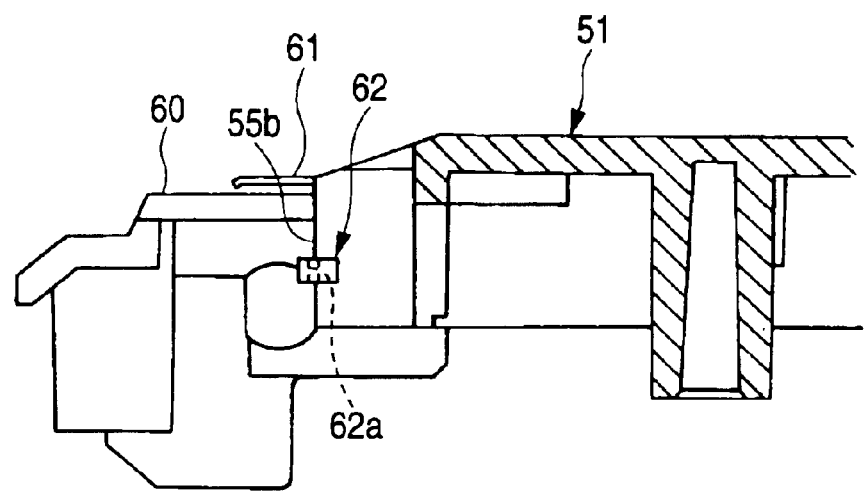
FIG. 5 is a sectional view of an upper cassette half in a magnetic tape cassette of a second embodiment according to the invention.

FIG. 5 shows an upper cassette half of a magnetic tape cassette in a second embodiment according to the invention. The upper cassette half 51 includes two upper lids 60 in a shape of flat plate which are positioned on a front face and at both sides of the magnetic tape cassette above a tape running area. The upper lids 60 are arranged at both sides of the opening of the cassette case. Each of the upper lids 60 is provided at a side adjacent to the opening with a cam cover 61 for preventing upward movement of a slide pin of an inner lid which is a part of an open/close lid coming out of the cassette case, and an upper wall (a front wall of the upper cassette half) 55b as position regulating means. A pair of the upper walls 55b constitute both sides of a front wall of the cassette case in combination with a pair of lower walls provided in a lower cassette half which is not shown. Projections 62 for dimensional reference formed with reference holes 62a are projected forward respectively from these upper walls 55b.

Figure 6:
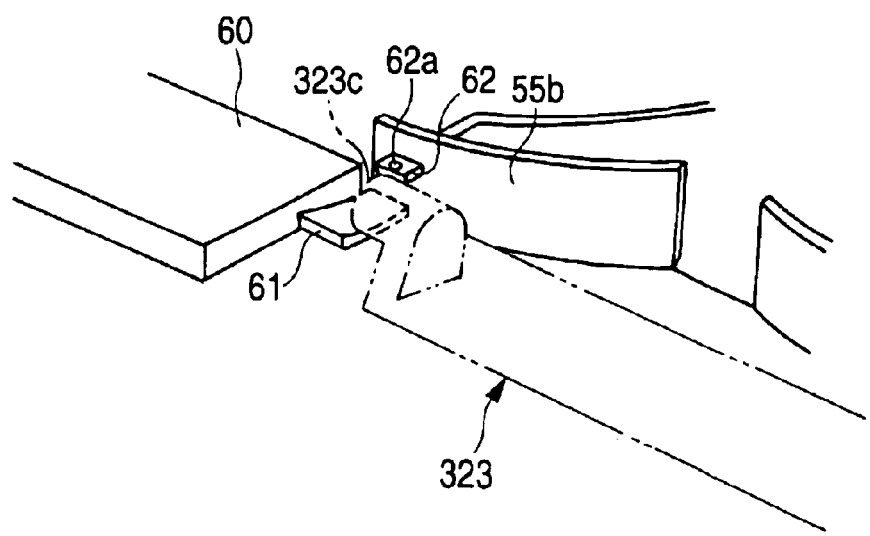
FIG. 6 is a rear view of the upper cassette half in the second embodiment.

A characteristic structure of this embodiment is that each of the upper walls 55b has a curved shape and is arranged at a forward position as compared with the conventional example as shown in FIG. 6. The upper wall 55b is in a form of a curved plate which is convex in a forward direction. Since the upper wall 55b is arranged more forwardly than in the conventional example, the upper wall 55b will be abutted against the slide pin 323c of the inner lid 323 in a state where the open/close lid is opened.

By the way, there is a fear that by arranging the upper wall 55b in the forward position, the upper wall 55b may not be flush with the lower wall of the lower cassette half, and as the result, dust proofing property cannot be assured. Therefore, as a countermeasure, the upper wall 55b may be inclined backward in a downward direction to make a mating face between the upper wall 55b and the lower wall flush, thus ensuring the dust proofing property.

Now, a method of assembling the magnetic tape cassette in this embodiment will be described. As a first step, the outer lid, the top lid and the inner lid are temporarily assembled. Then, the slide pins of the top lid are engaged in the cam grooves for the upper lid provided in the upper cassette half, and at the same time, the pivotal pins of the outer lid are engaged with the pin holding cutouts in both side walls of the upper cassette half.

Figure 7:
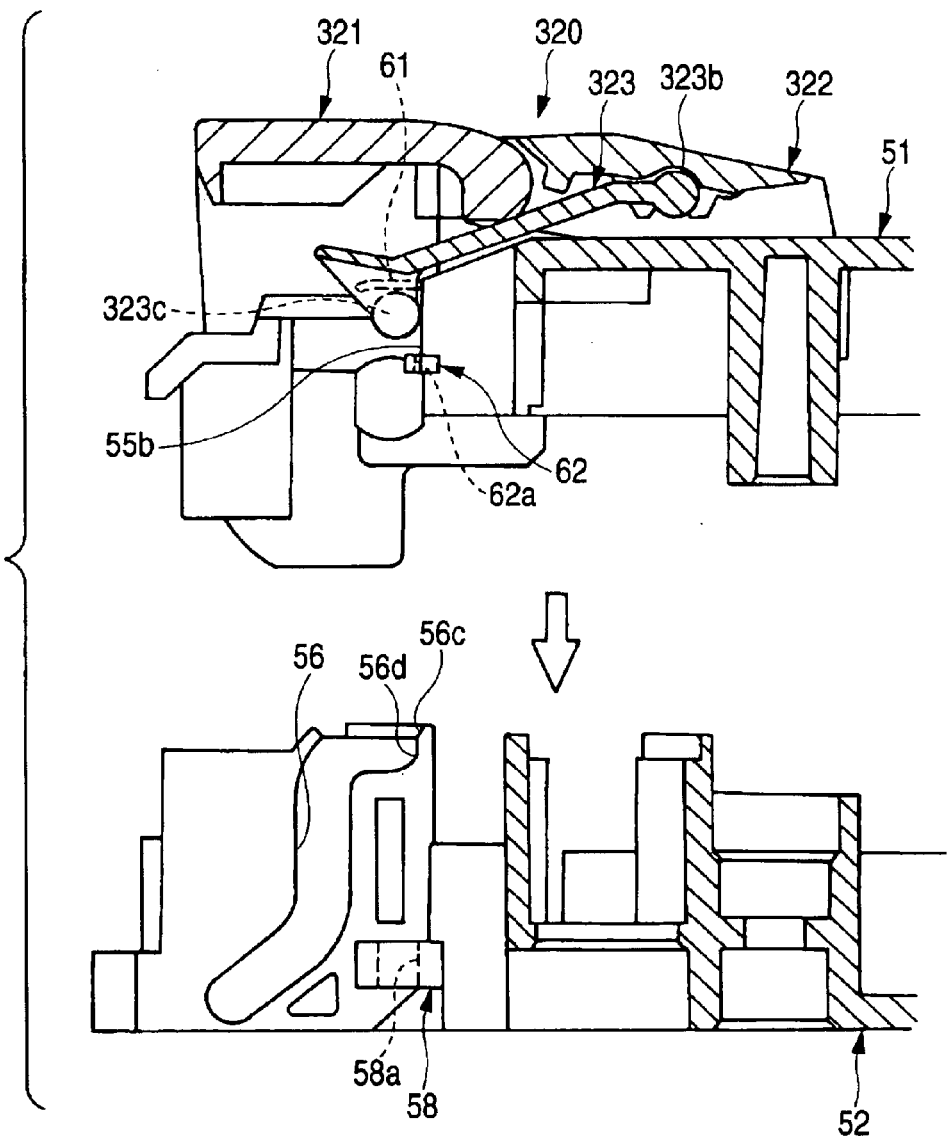
FIG. 7 is a view for explaining assembling steps of the second embodiment.

Thereafter, as shown in FIG. 7, the upper cassette half 51 and the lower cassette half 52 are assembled together in a state where the open/close lid 320 is fully opened, while positioning the reference holes 62a, 58a of the respective dimensional reference projections 62, 58. On this occasion, when the open/close lid 320 has been brought into a fully opened state, the upper walls 55b provided in the upper cassette half 51 are abutted against the slide pins 323c of the inner lid 323 to regulate the position of the inner lid 323. The positioning of the inner lid 323 can be accurately performed by making this abutted position as the reference, and the slide pins 323c of the inner lid 323 can be reliably inserted into the cam grooves 56 for the inner lid in the lower cassette half 52.

From a viewpoint of improving assembling performance, there is provided a tapered guide 56c at an upper end of an end wall 56d on a top of the cam groove 56 for the inner lid. The cam groove 56 for the inner lid is open in an upward direction so that the slide pin 323c of the inner lid 323 can be inserted therein. The tapered guide 56c is provided at an edge of the opening.

In the above described embodiment, the slide pins of the inner lid are regulated in position, by arranging the curved upper walls 55b in the more forward position than the conventional upper wall. However, means for regulating the position are not restricted to this embodiment, but appropriate variations and modifications can be made. For example, the upper walls of the upper cassette half may be at the same position as in the conventional example, and additional projections may be provided on the upper walls to regulate the position of the inner lid by means of these projections. Alternatively, by cutting the cam grooves for the upper lid in the upper cassette half into which the slide pins of the top lid are adapted to be engaged deep in a backward direction for a determined length, the upper walls at the same position as in the conventional example can be abutted against the slide pins of the inner lid thus to regulate the position of the inner lid.

Figure 8:
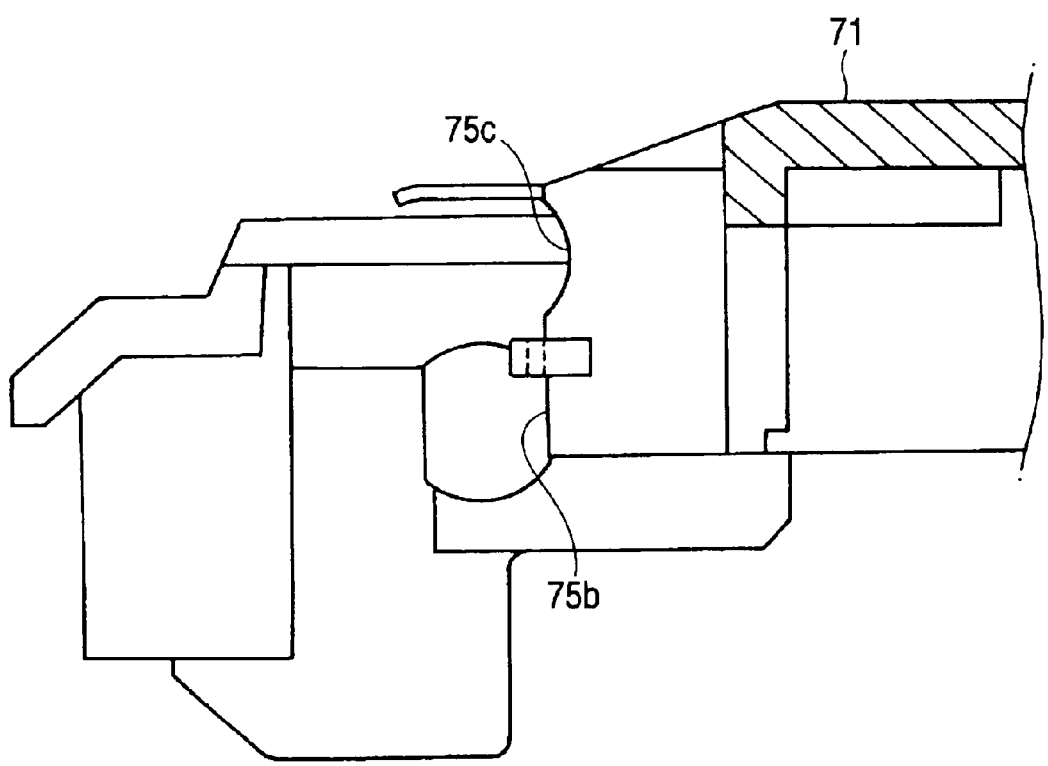
FIG. 8 is a sectional view of an upper cassette half in a magnetic tape cassette of a third embodiment according to the invention.

FIG. 8 shows an upper cassette half 71 of a magnetic tape cassette in a third embodiment according to the invention. As shown in FIG. 8, the upper cassette half 71 is provided with an upper wall 75b as position regulating means. The upper wall 75b is provided with a concave part 75c at least one portion of which has a curved face of substantially the same curvature as an outer peripheral face of the slide pin of the inner lid. This concave part 75c holds the slide pin of the inner lid thereby enabling the inner lid to be positioned.

Figure 9:
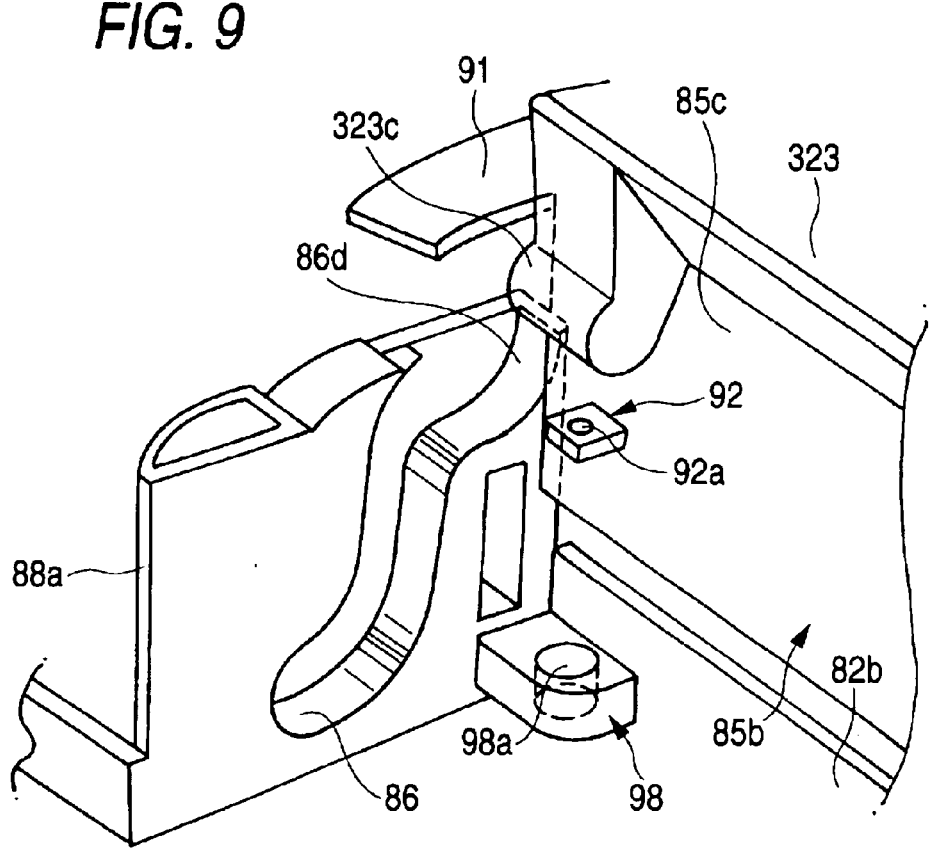
FIG. 9 is a perspective view of an essential part of a magnetic tape cassette of a fourth embodiment according to the invention.
Figure 10:
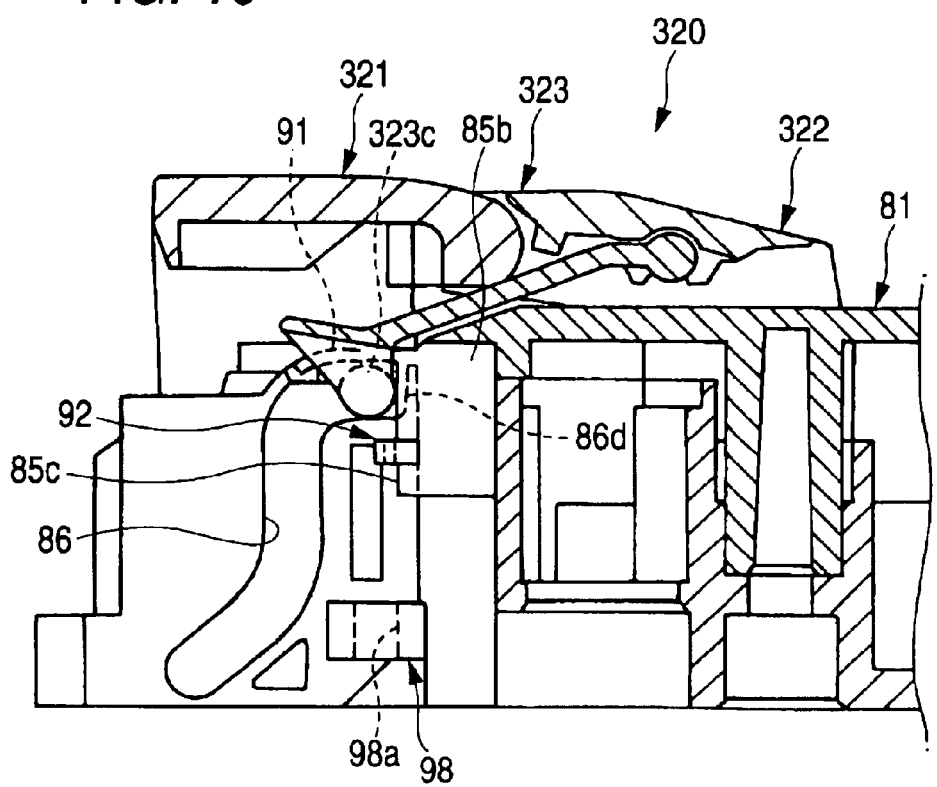
FIG. 10 is a sectional view of the magnetic tape cassette of the fourth embodiment.

FIGS. 9 and 10 show a structure around a cam groove for an inner lid of a magnetic tape cassette in a fourth embodiment according to the invention. As shown in FIGS. 9 and 10, an upper cassette half 81 in this embodiment is provided with a cam cover 91 for restraining a movement of the slide pin 323c of the inner lid 323 upward of the cassette, and an upper wall 85b as the position regulating means. A projection 92 for dimensional reference provided with a reference hole 92a is projected from the upper wall 85b.

A characteristic structure of this embodiment is that a slide pin abutting face (a front face) 85c of the upper wall 85b is arranged ahead of an end wall 86d in an upper part of a cam groove 86 for the inner lid. The end wall 86d extends substantially perpendicularly to a flat plate 82b of the lower cassette half. In a fully opened state of the open/close lid 320, the slide pin abutting face 85c of the upper wall 85b is abutted against the slide pin 323c of the inner lid 323 thereby to position the inner lid 323. On this occasion, the slide pin 323c is positioned directly above an opening of the cam groove 86 for the inner lid. Accordingly, the slide pin 323c can be easily inserted into the cam groove 86 for the inner lid. Moreover, because the slide pin abutting face 85c of the upper wall 85b is arranged ahead of the end wall 86d of the cam groove 86 for the inner lid, the slide pin 323c will not be abutted against the end wall 86d of the cam groove 86 for the inner lid when the upper cassette half is assembled to the lower cassette half. In other words, the slide pin 323c can be reliably inserted into the cam groove 86 for the inner lid without interfering with the end wall 86d.

For information, the slide pin abutting face 85c of the upper wall 85b and the end wall 86d of the cam groove 86 for the inner lid may be located on the same plane.

Figure 11:
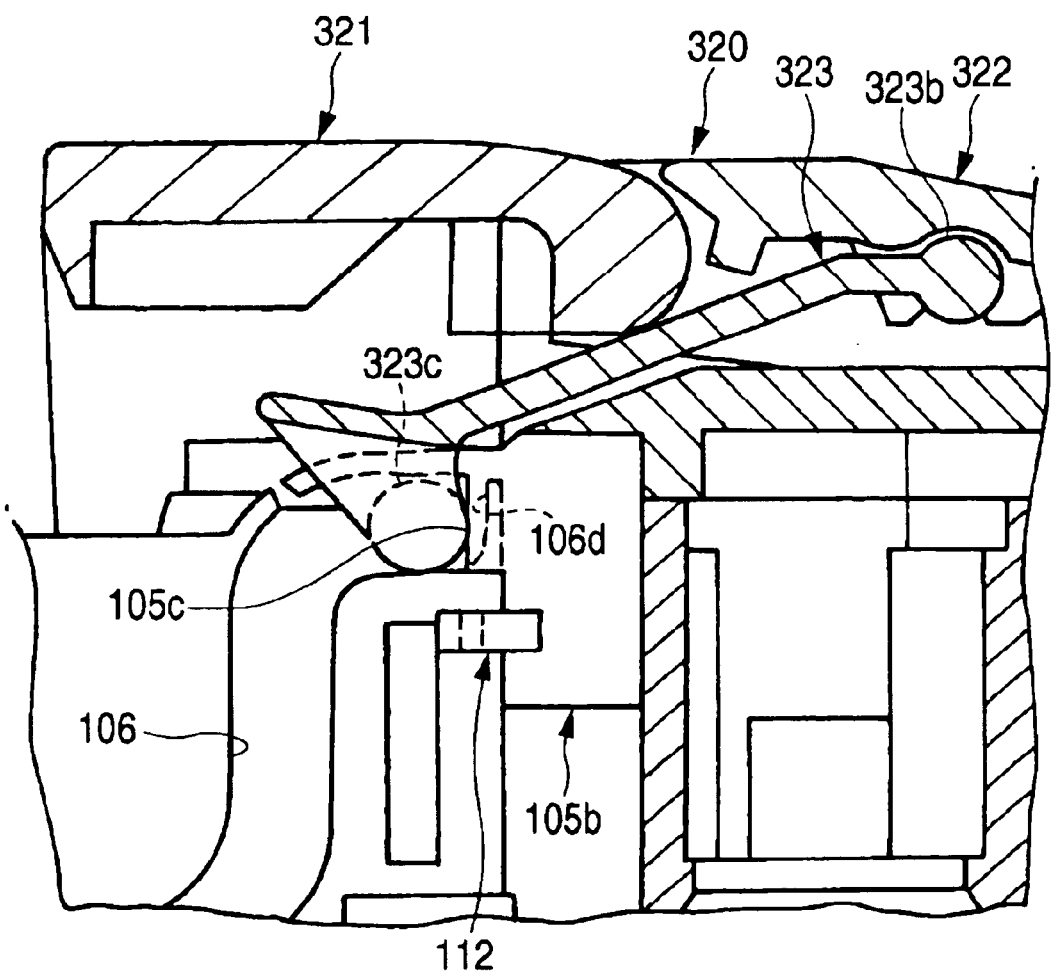
FIG. 11 is a sectional view of an essential part of a magnetic tape cassette of a fifth embodiment according to the invention.

FIG. 11 is a sectional view of a part of a magnetic tape cassette in a fifth embodiment according to the invention. As shown in FIG. 11, a portion (a front face of a base part) 105c of an upper wall 105b of an upper cassette half in this embodiment is arranged ahead of an end wall 106d of a cam groove 106 for an inner lid, and the portion 105c acts as an abutting face against the slide pin. In a fully opened state of the open/close lid 320, the portion 105c of the upper wall 105b is abutted against the slide pin 323c of th inner lid 323 thereby to position the inner lid 323. Moreover, because the slide pin abutting face 105c of the upper wall 105b is arranged ahead of the end wall 106d of the cam groove 106 for the inner lid, the slide pin 323c can be reliably inserted into the cam groove 106 for the inner lid without interfering with the end wall 106d, when the upper cassette half is assembled to the lower cassette half. For information, the slide pin abutting face 105c of the upper wall 105b and the end wall 106d of the cam groove 106 for the inner lid may be located on the same plane.

Figure 12:
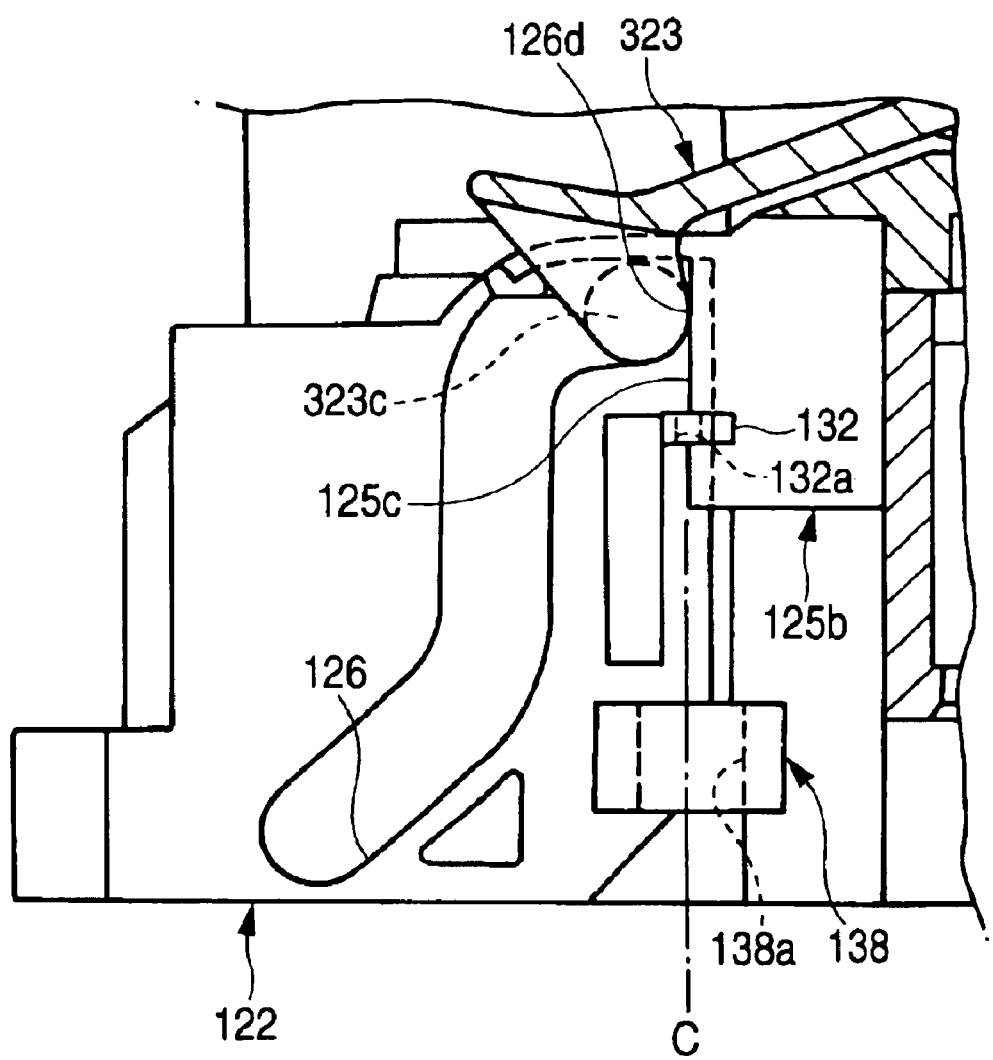
FIG. 12 is a sectional view of an essential part of a magnetic tape cassette of a sixth embodiment according to the invention.

FIG. 12 is a sectional view of a part of a magnetic tape cassette in a sixth embodiment according to the invention. As shown in FIG. 12, a projection 132 for dimensional reference provided with a reference hole 132a is projected forward from an upper wall 125b of an upper cassette half in this embodiment. A lower cassette half 122 is provided with a projection 138 for dimensional reference formed with a reference hole 138a.

A characteristic structure of this embodiment is that a slide pin abutting face (a front face) 125c of the upper wall 125b and an end wall 126d of a cam groove 126 for an inner lid include a center line C of the reference hole 138a of the projection 138 for dimensional reference, and is positioned substantially on the same plane as a plane which is parallel to a vertical direction of the cassette case (in a direction perpendicular to the flat plates of both the upper and lower cassette halves). Herein, the expression "is positioned substantially on the same plane" includes a concept that they are positioned not only on the completely same plane, but they may be deviated in back and forth directions of the cassette within a range of 1.0 mm or less.

By positioning the reference holes 132a, 138a of the projections 132, 138 for dimensional reference while the open/close lid is fully opened, the position of the slide pin 223c of the inner lid 323 in the back and forth direction can be aligned with a position of an insertion opening of the cam groove 126 for the inner lid. On this occasion, the slide pin 323c is located directly above the opening of the cam groove 126 for the inner lid. Therefore, assembling performance of both the upper and lower cassette halves can be enhanced according to this embodiment.

Figure 13:
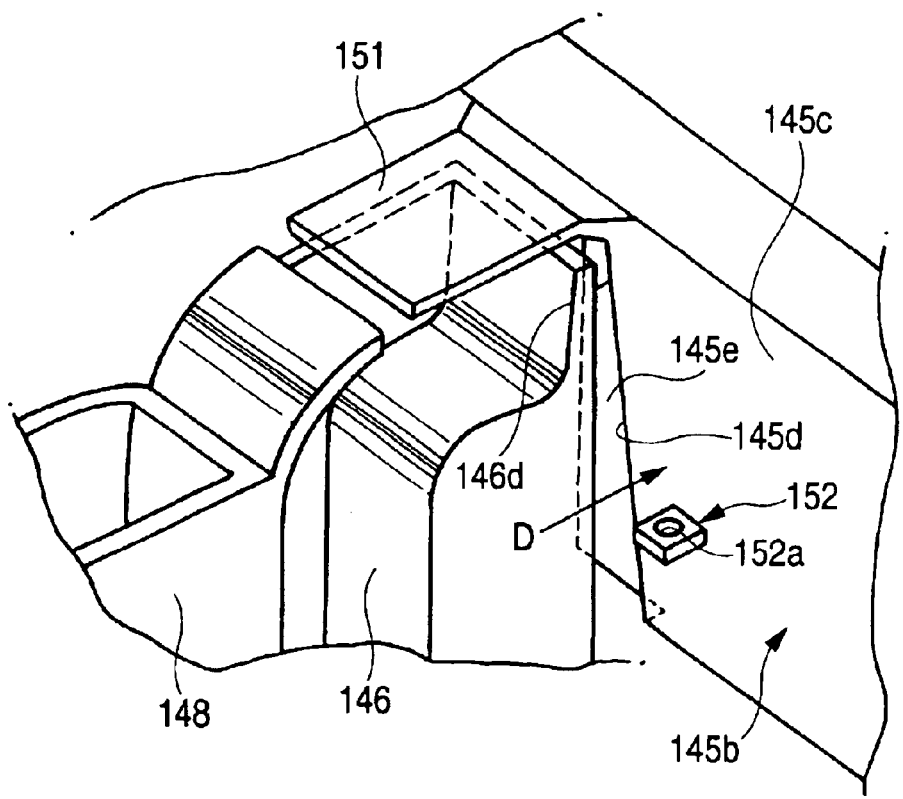
FIG. 13 is a perspective view showing a structure around a preferable cam groove for an inner lid.
Figure 14:
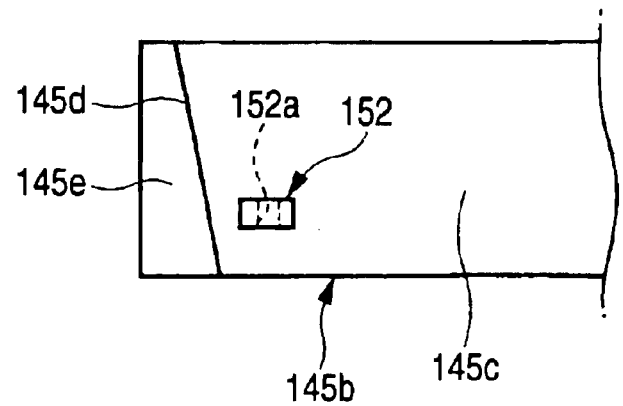
FIG. 14 is a view showing a preferable front wall of an upper cassette half.

In either of the above described embodiments, from viewpoints of dust proofing property and assembling performance of the upper and lower cassette halves, the front wall of the upper cassette half may preferably have such a structure as shown in FIGS. 13 and 14. As shown in FIGS. 13 and 14, a projection 152 for dimensional reference provided with a reference hole 152a is projected from an upper wall 145b of the upper cassette half. An end part 145e of the upper wall 145b adjacent to a tape guide 148 (adjacent to a side wall of the upper cassette half) is arranged backward (inward of the cassette case) with respect to a slide pin abutting face 145c. There is formed a step-like difference between the slide pin abutting face 145c and the end part 145e. When the upper cassette half is assembled to the lower cassette half, this end part 145e is positioned in the back of an end wall 146d of the cam groove 146 for the inner lid to constitute a socket and spigot joint. In short, the end wall 146d of the tape guide 148 and the upper wall 145b are engaged in a manner of projection and depression. Thus, dust proofing property can be ensured. A boundary face 145d of the step-like difference is inclined toward a center of the opening (the center in a longitudinal direction of the cassette case) in a downward direction. Because of this inclined face of the boundary face 145d, a collision of the end wall 146d of the cam groove 146 for the inner lid against the upper wall 145b can be reliably prevented, when the upper cassette half is assembled to the lower cassette half. In case where the upper cassette half is being assembled to the lower cassette half in a state where the upper cassette half is deviated from the lower cassette half, the upper cassette half will be guided to a proper position by means of the boundary face 145d. Thus, the upper cassette half can be smoothly assembled to the lower cassette half.

It is to be noted that the present invention is not restricted to those embodiments described above, but appropriate variations and modifications can be made. For example, it is apparent that the embodiment as shown in FIG. 8 can be applied to the other embodiments.

Figure 15:
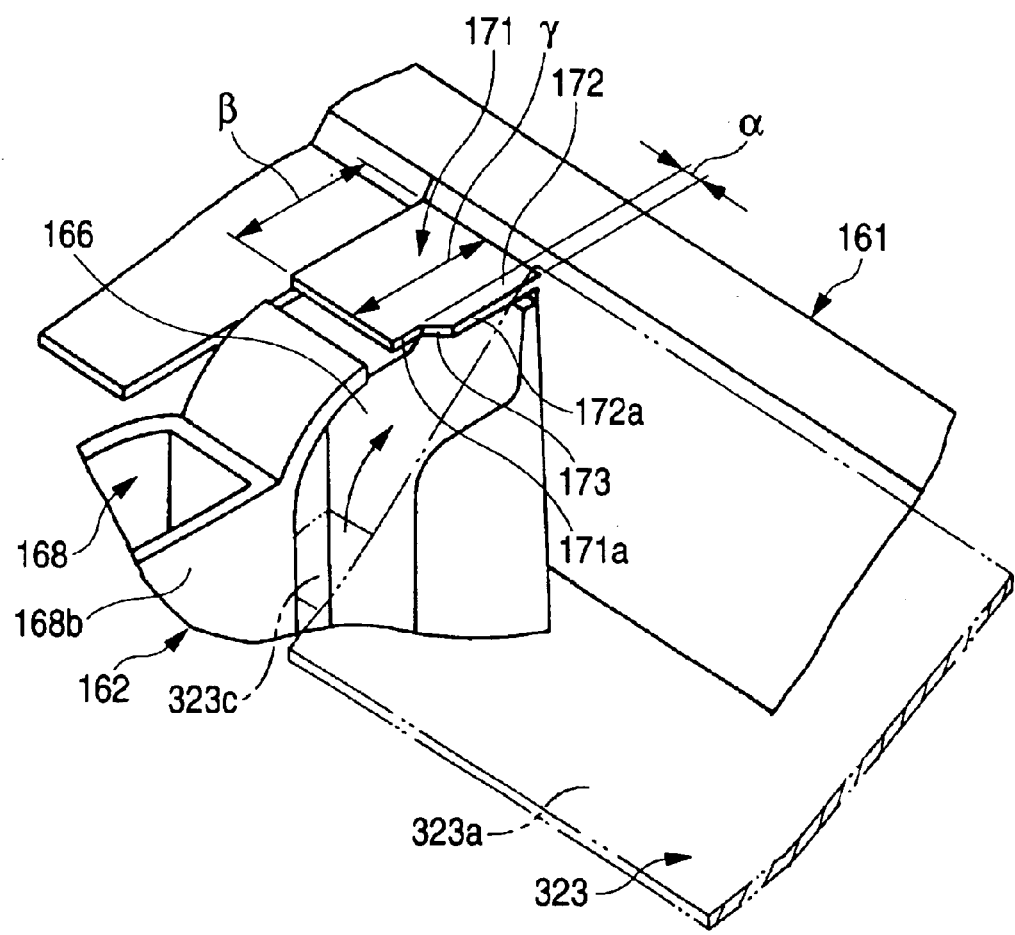
FIG. 15 is a perspective view of an essential part of a magnetic tape cassette of a seventh embodiment according to the invention.

FIG. 15 shows a structure around a cam groove for an inner lid in a magnetic tape cassette (DVC of the M type for a broadcast station) in a seventh embodiment.

An open/close lid in this embodiment is also composed of an outer lid, a top lid and an inner lid 323. The inner lid 323 is provided with slide pins 323c at both ends of a lower edge of a back lid plate 323a. The slide pins 323c are slidably engaged in cam grooves 166 for the inner lid formed on inner faces of tape guides 168 which are provided at both sides of an opening of a lower cassette half 162. The cam grooves 166 for the inner lid have an S-shape and are open above the tape guides 168. From a front end of an upper cassette half 161, there are projected forwardly cam covers 171 in a shape of flat plate for covering upper ends of the openings of the cam grooves 166 for the inner lid. The cam covers 171 are provided at both sides of the openings. The cam covers 171 restrain the slide pins 323c of the inner lid 323 from being detached upward out of the cam grooves 166.

An inner face 171a of one of the cam covers 171 opposed to the other cam cover which is not shown is provided at its base part with a protrusion 172 for guiding a movement of the inner lid 323. The protrusion 172 projects from the inner face 171a inwardly with a minute width α. In short, the inner face 171a is integrally provided with the protrusion 172 which further projects inwardly beyond the inner face 171a, and both the side faces of the inner lid 323 are restricted in position by means of inner faces 172a of both the protrusions 172. A length of the protrusion in back and forth direction is γ which is slightly shorter than a length β of the cam cover 171 in the back and forth direction.

Between the inner face 171a of the cam cover 171 and the inner face 172a of the protrusion 172, there is formed a tapered face (a guide face) 173. Because of the presence of this tapered face 173, the inner lid 323 can smoothly move between the inner face 171a of the cam cover 171 and the inner face 172a of the protrusion 172.

Now, operation of the magnetic tape cassette in this embodiment will be described. When the open/close lid is opened and closed, the inner lid 323 performs opening and closing motions in association with the outer lid and the top lid, and both the side faces of the inner lid 323 are guided along the protrusions 172. The inner lid 323 guided by the protrusions 172 is drawn to a position at a center of the cassette (a center of the opening), and there are created spaces respectively between both the side faces of the inner lid 323 and the inner faces of the tape guides 168. In this manner, interferences of the inner lid 323 with the tape guides 168 will be prevented, enabling the opening and closing motion of the open/close lid to be smoothly conducted, and occurrence of an error such as drop out and so on due to abrasion powder can be avoided.

Further, in a state where the open/close lid is completely closed, the upper edge of the inner lid 323 is positioned ahead of the tapered faces 173, and the inner lid 323 will not be held by the protrusions 172 from both sides. In other words, there are created spaces between entire surface of the side faces of the inner lid 323 and the inner faces 168b of the tape guides 168, and thus, the inner lid 323 is made free. When the magnetic tape cassette has accidentally fallen down, an outer force can be received by the entire surface of the side faces of the inner lid 323, and it can be avoided that only a part of the inner lid 323 is intensively loaded. As the results, damage of the magnetic tape cassette due to a shock or the like can be eliminated.

Figure 16:
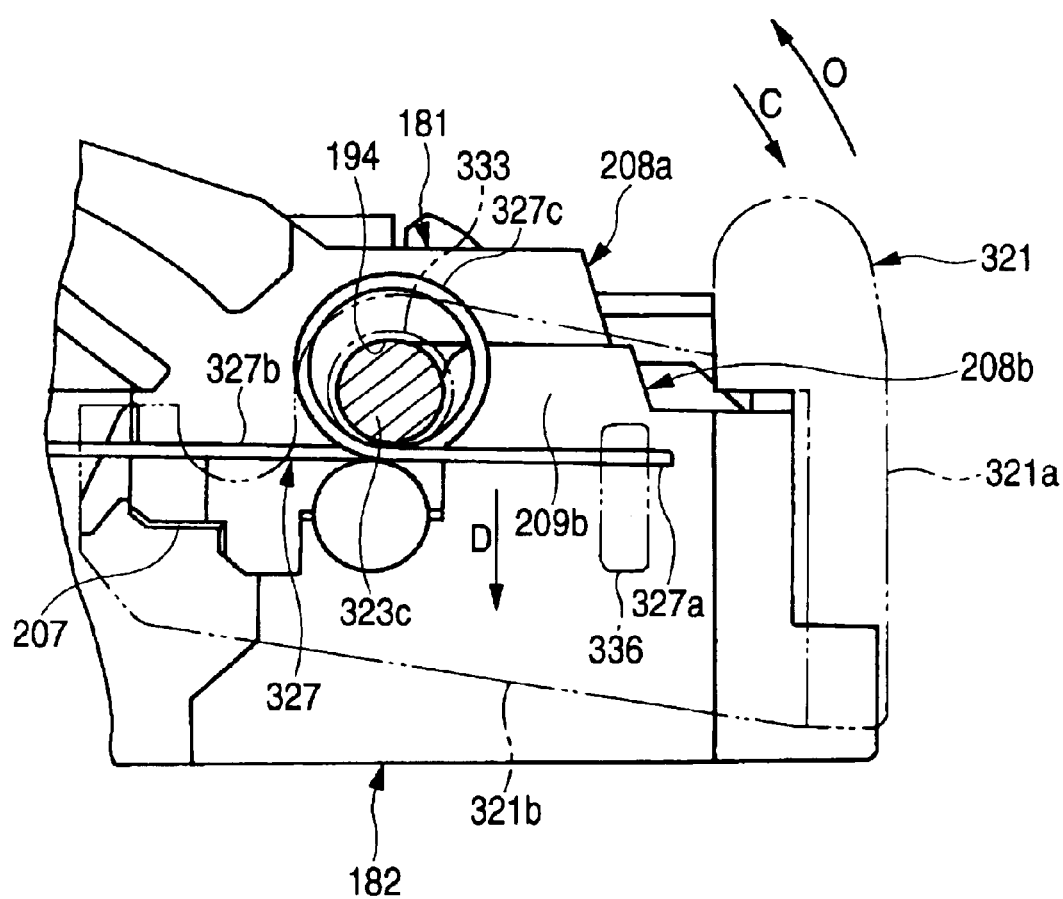
FIG. 16 is a side view of an essential part of a magnetic tape cassette of an eighth embodiment according to the invention.
Figure 17:
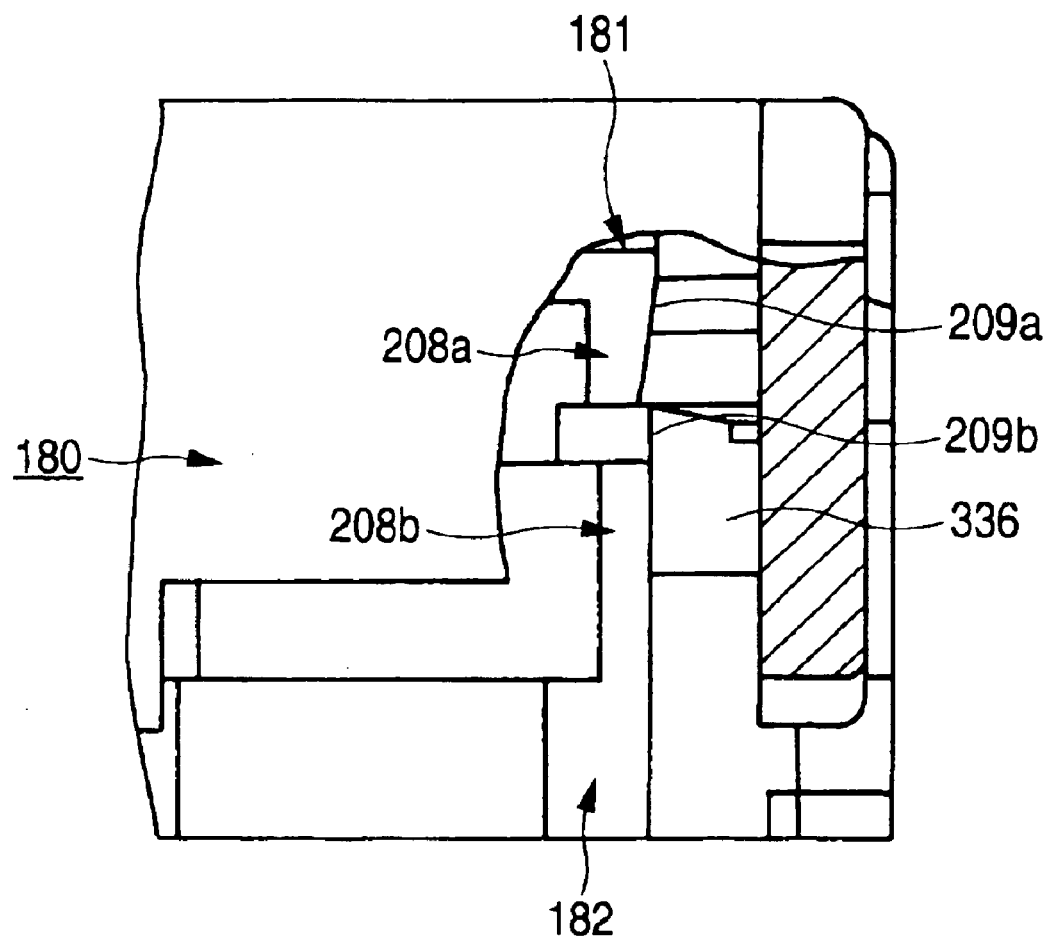
FIG. 17 is a front view of the eighth embodiment.

FIGS. 16 and 17 show a magnetic tape cassette (DVC of the M type for a broadcast station) in an eighth embodiment according to the invention. FIG. 16 is a view showing an outer face of a side wall of the magnetic tape cassette. FIG. 17 is a partly exploded view showing a front side of the magnetic tape cassette.

A pin holding hole 194 is defined by pin supporting pieces 208a, 208b which are integrally provided at front sides of the side walls of the upper and lower cassette halves 181, 182. Into the pin holding hole 194, is engaged a pivotal pin 321c having a distal end flange 333 which is provided on a side plate 321b of an outer lid 321.

Figure 18:
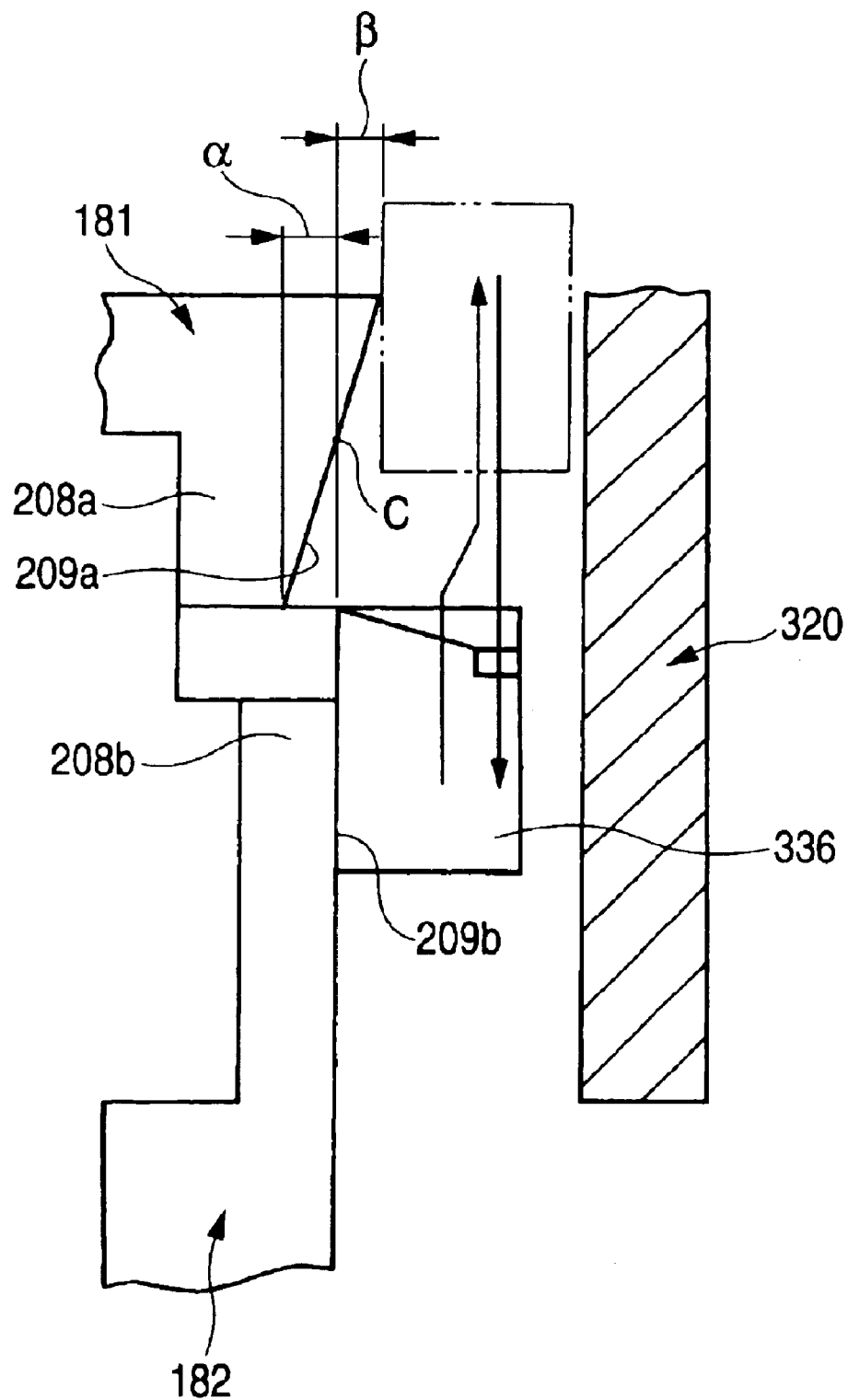
FIG. 18 is a view for explaining operation of the eighth embodiment.

As shown in FIG. 18, an outer face 209a of the pin supporting piece 208a of the upper cassette half 181 is inclined at a constant gradient so as to be directed outward from a lower end toward an upper end. There is a difference having a minute width α between lateral positions at a lower end and lateral positions; at a determined part C (a central position in a vertical direction, for example) of the outer face 209a of the pin supporting piece 208a. There is also a difference having a minute width β (β=α) between the lateral positions at the part C and lateral positions at an upper end of the outer face 209a. Lateral positions of the outer faces 209b of the pin supporting piece 208b of the lower cassette half 182 are positioned on a flat plane along the vertical direction of the cassette case, which includes the determined part C of the outer face 209a of the pin supporting piece 208a of the upper cassette half 181.

Now, operation of this embodiment will be described. When the magnetic tape cassette has been loaded in a hardware which is not shown, the outer lid 321 will be pushed upward by means of a lid opening pin of the hardware, and the open/close lid will be opened. The spring hook projection 336 provided on the outer lid 321 is moved along the outer face 209b of the pin supporting piece 208b of the lower cassette half 182. After the spring hook projection 336 has ridden across the outer face 209b of the pin supporting piece 208b of the lower cassette half 182 and the outer face 209a of the pin supporting piece 208a of the upper cassette half 181, the spring hook projection 336 will be moved upwardly and outwardly along the outer face 209a of the pin supporting piece 208a of the upper cassette half 181. There is no such step-like difference between the outer faces 209a and 209b of the pin supporting pieces 208a, 208b of the upper and lower cassette halves as interfering with the spring hook projection 336. As the results, the open/close lid 320 can be smoothly opened. In addition, an occurrence of an error such as a dropout and so on due to abrasion powder will be avoided.

On occasion of closing the open/close lid 320, the spring hook projection 336 will be moved downward by means of a force of the lid spring 327, from the state where the spring hook projection 336 is kept in contact with an upper end of the outer face 209a of the pin supporting piece 208a of the upper cassette half which is located at the outermost side. The open/close lid 320 will be moved downward without contacting the outer faces 209a, 209b of the pin supporting pieces 208a, 208b of the upper and lower cassette halves.

Figure 19:
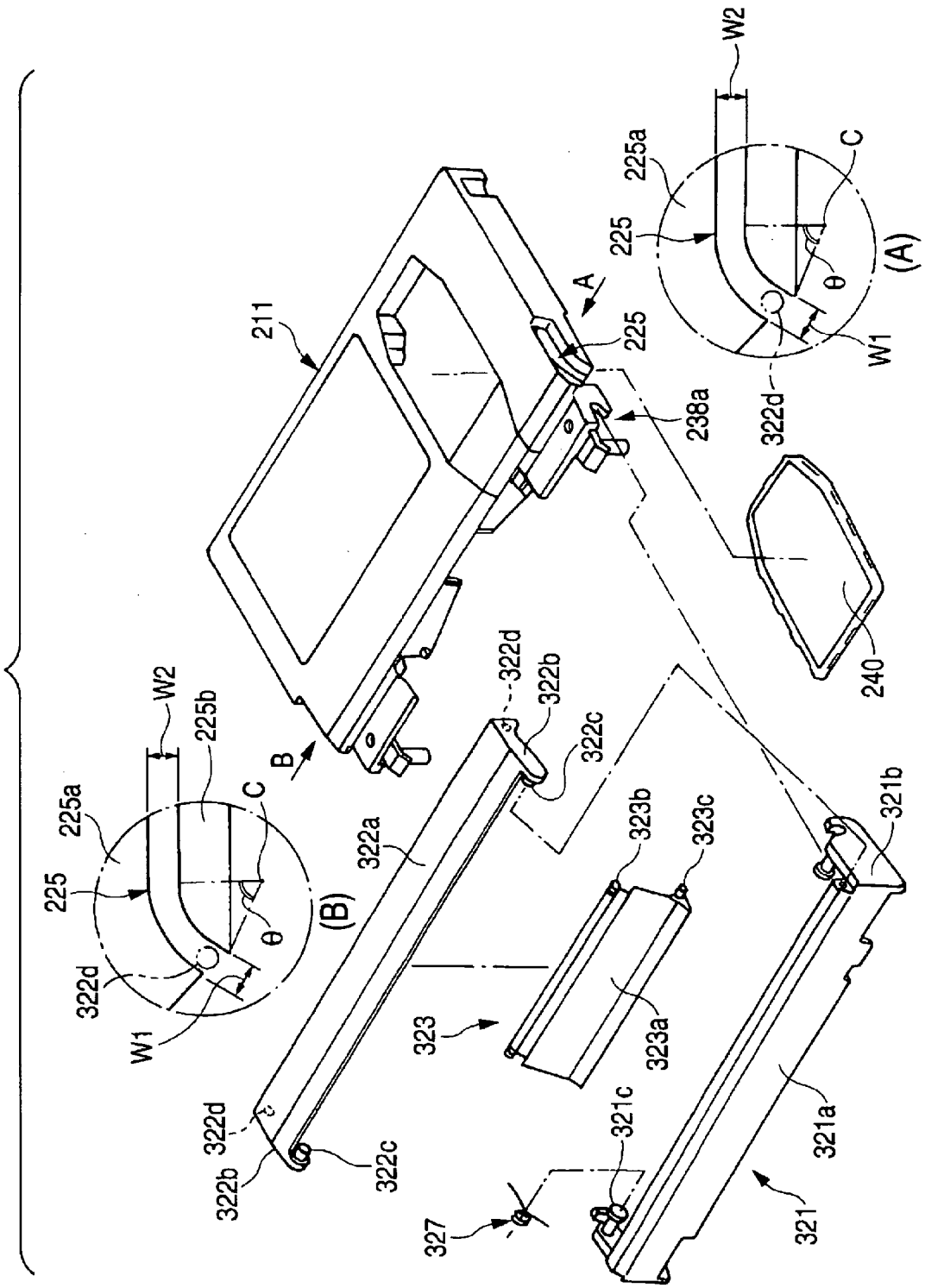
FIG. 19 is a view showing an upper cassette half, an open/close lid and a window member in a magnetic tape cassette of a ninth embodiment according to the invention.

FIG. 19 shows an upper cassette half 211, an open/close lid, and a window member 240 in a magnetic tape cassette in a ninth embodiment according to the invention. In order to confirm an amount of the magnetic tape wound around a reel (not shown), a flat plate of the upper cassette half 211 is provided with an opening which extends in a lateral direction of the flat plate at one side in a longitudinal direction (a right side in the drawings, herein referred to as an "S side") of the upper cassette half 211. The transparent window member 240 is fitted so as to cover the opening.

The outer lid 321 includes a front lid plate 321a covering a front face of the magnetic tape which is not shown, and side plates 321b provided at both ends of the front lid plate 321a. There are provided pivotal pins 321c projected from inner faces of both the side plates 321b and adapted to be rotatably engaged with pin supporting pieces 238a provided at both ends of a forward part of the upper cassette half 211.

A lid spring 327 in a form of a helical spring is mounted on one of the pivotal pins 321c which is projected from the side plate 321b of the outer lid 321 and adapted to be engaged with the other side in a longitudinal direction (a left side in the drawings, herein referred to as a "T side") of the upper cassette half 211. The lid spring 327 has such a shape that both ends of its coiled part are respectively extended rectilinearly.

The top lid 322 has an upper lid plate 322a covering an upper edge of the magnetic tape, and side plates 322b provided at both ends of the upper lid plate 322a. There are provided front lid connecting pins 322c projected from forward sides of inner faces of the side plates 322b and adapted to connect the top lid 322 to the outer lid 321. There are further provided slide pins 322d at rearward ends of the inner faces of the side plates 322b and adapted to be slidably engaged with cam grooves 225 for the upper lid which are formed at both sides of a forward part of the upper cassette half 211.

The inner lid 323 has a back lid plate 323a covering a back side of the magnetic tape. There are provided upper lid connecting pins 323b projected from both ends of an upper edge of the back lid plate 323a and adapted to connect the inner lid 323 to the top lid 322. There are further provided slide pins 323c projected from both sides of a lower edge of the back lid plate 323a and adapted to be slidably engaged with cam grooves for an inner lid which are provided in tape guides of a lower cassette half which is not shown.

FIG. 19A is a view as seen in a direction of an arrow A in FIG. 19, and FIG. 19B is a view as seen in a direction of an arrow B in FIG. 19. As shown in FIGS. 19A and 19B, each of the cam grooves 225 for the upper lid is formed between a ceiling 225a and a bottom 225b of the cam groove, consisting of a forward arc-shaped portion (having a center of curvature C and a central angle θ) as a curved portion and a backward, rectilinear portion.

At the T side as shown in FIG. 19B, a width W1 of the cam groove 225 at an open end of the arc-shaped portion is equal to a width W2 of the rectilinear portion. In short, the cam groove 225 has the same width along the entire length. Accordingly, a difference (hereinafter referred to as a "gap") between the width of the groove and an outer diameter of the slide pin 322d of the top lid 322 is constant along the entire length of the cam groove 225.

On the other hand, at the S side as shown in FIG. 19A, the width W1 of the cam groove 225 at the open end of the arc-shaped portion is larger than the width W2 of the rectilinear portion. At the S side, up to an intermediate point of the arc-shaped portion of the cam groove 225, that is, a front half of the arc-shaped portion is set to have the width W1, while in a rear half of the arc-shaped portion, the width of the cam groove is gradually decreased to W2 and smoothly continued to the rectilinear portion. The width W2 of the rectilinear portion at the S side is set to be equal to the width W2 of the rectilinear portion at the T side. For example, the width of the groove W1 of the arc-shaped portion at the S side may be 2.1 mm, and the width of the groove W2 of the rectilinear portion may be 2.0 mm.

It is to be noted that the cam groove at the S side is not limited to this shape, but the width of the groove may be set to be W1 along the entire length of the arc-shaped portion, and may be gradually decreased from W1 in the rectilinear portion.

On occasion of assembling the open/close lid to the upper cassette half 211, the outer lid 321, the top lid 322 and the inner lid 323 have been temporarily assembled in advance. Then, the pivotal pins 321c of the outer lid 321 are engaged with the pin supporting pieces 238a of the upper cassette half 211, and at the same time, the slide pins 322d of the top lid 322 are inserted into the cam grooves 225 of the upper cassette half 211, thereby to complete assembling of the open/close lid to the upper cassette half 211. At this moment, the open/close lid is in a closed state, and the slide pins 322d are positioned near the open ends of the cam grooves 225 as shown in FIGS. 19A, 19B. By assembling this upper cassette half to the lower cassette half which is not shown, the magnetic tape cassette can be formed.

In order to open the open/close lid of the magnetic tape cassette, a lock of the open/close lid is released by lock releasing means which are not shown, and when the outer lid 321 is rotated about the pivotal pins 321c against the force of the lid spring 327, the front side of the top lid 322 supported by the outer lid 321 will be raised along an arc. At an instant when the top lid 322 starts to be raised, the slide pin 322d at the S side as shown in FIG. 19A swings toward the bottom 225b of the cam groove, but the slide pin 322d will not get in touch with the bottom 225b since the width W1 of the cam groove 225 is larger in the arc-shaped portion. Thereafter, the slide pin 322d at the S side will be also moved upward along the arc-shaped portion of the cam groove 225.

According to the magnetic tape cassette having the above described structure, generation of abrasion powder due to abrasion between the cam grooves 225 for the upper lid of the upper cassette half 211 and the slide pins 322d of the top lid 322 can be reliably prevented, and a dropout and so on will not occur.

It is to be noted that the invention is not limited to the above described embodiment, but appropriate variations and modifications can be made. For example, the width of the cam groove in the curved portion at the T side may be smaller than in the rectilinear portion, and the width of the cam groove in both the curved portion and the rectilinear portion at the S side may be equal to the width of the rectilinear portion of the cam groove at the T side. In this manner, because the gap with respect to the slide pin in the curved portion of the cam groove at the T side has been made extremely narrow, the slide pin at the S side swings to less extent, and abrasion will not occur at the S side. It is also possible to apply technical concept of the invention to the inner lid.

Figure 20:
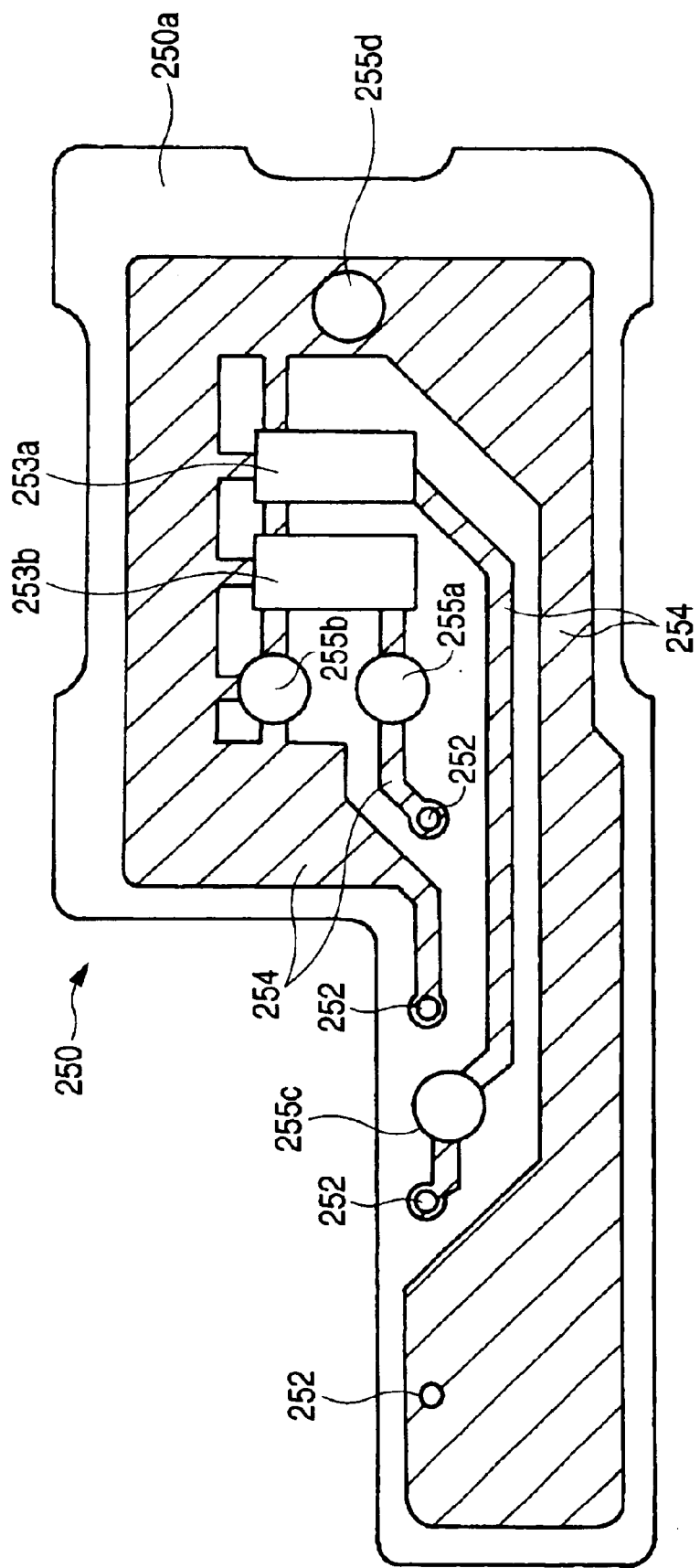
FIG. 20 is a view showing an electric circuit board in a magnetic tape cassette of a tenth embodiment according to the invention.

FIG. 20 shows an ID board in a magnetic tape cassette in a tenth embodiment according to the invention. The ID board 250 is constructed by providing a determined printed wiring 254, and by mounting chip resistors 253a, 253b which are circuit elements, on a surface of a base plate 250a in a substantially L-shape.

Figure 34:
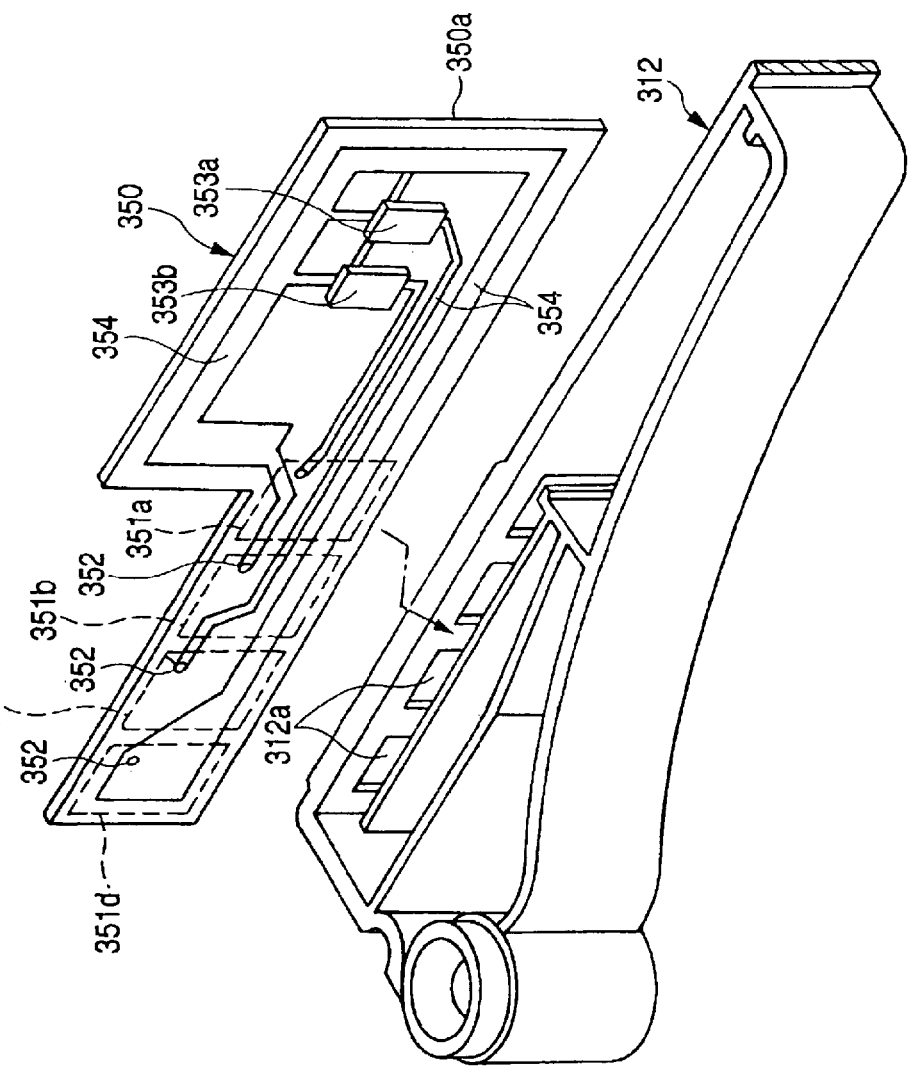
FIG. 34 is a view showing a structure for assembling an ID board in the conventional magnetic tape cassette.
Figure 35:
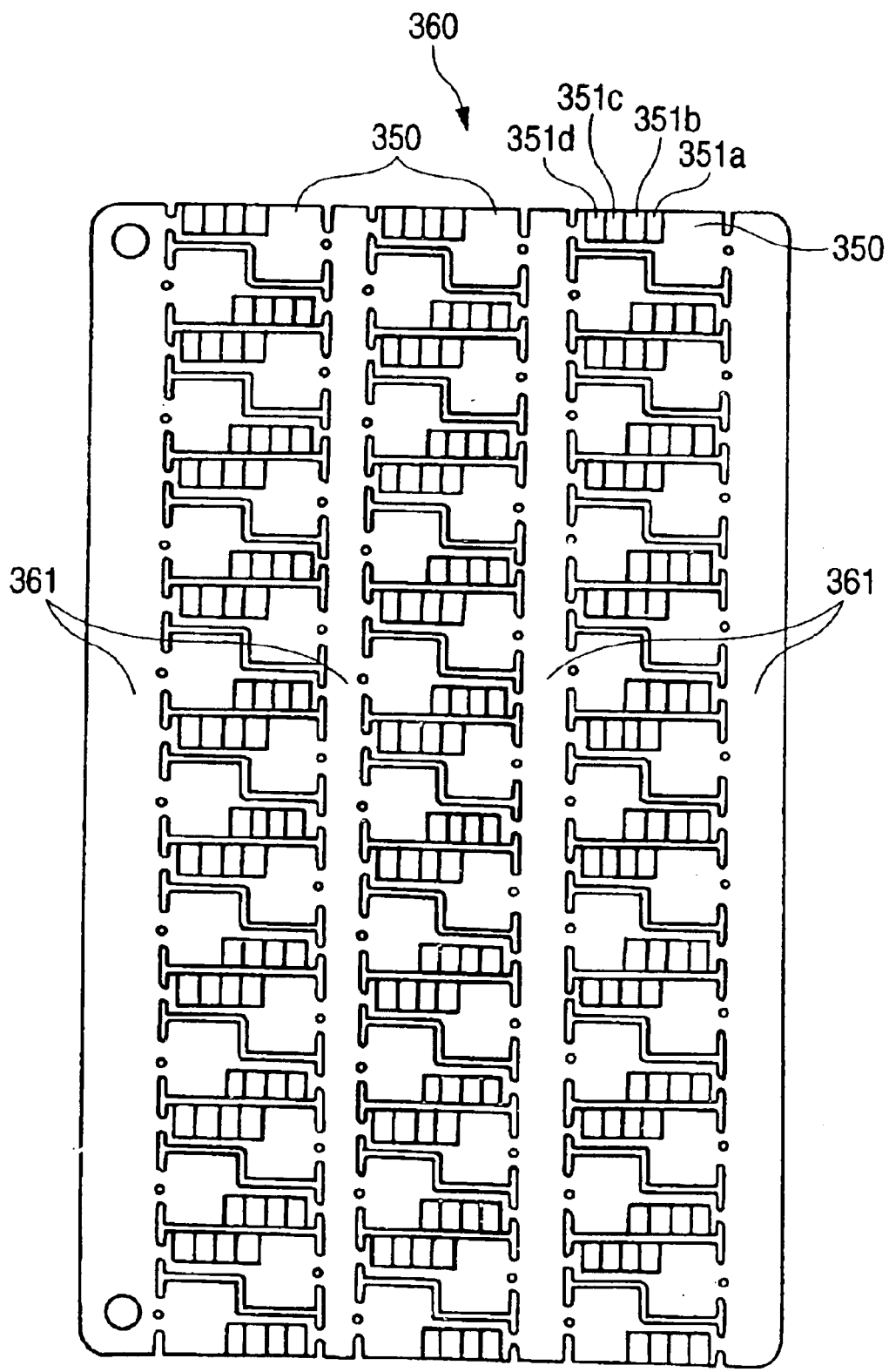
FIG. 35 is a view showing the conventional ID board.

The base plate 250a is provided with four through holes 252. At respective positions on a back face of the base plate 250a corresponding to the through holes 252, there are provided rectangular contacts 351a to 351d (refer to FIG. 34) acting as first contact parts, in the same manner as in the conventional product. These rectangular contacts and the chip resistors 253a, 253b on the surface of the base plate 250a are electrically connected to each other by ways of the printed wiring 254. In this embodiment, there are provided four circular contacts 255a, 255b, 255c, 255d (plated terminals) acting as second contact parts, at determined positions on the printed wiring 254 of the base plate 250a. The contacts 255a, 255b, 255c, 255d are electrically connected to the contacts 351a, 351b, 351c, 351d on the back face of the base plate 250a respectively.

Now, steps of producing the ID board 250 will be described hereunder.

As a first step, material for the base plate is prepared by attaching copper foils to both faces of an epoxy resin containing glass plate. The copper foils having the rectangular shape are left on one face (a back face) of the material of the back plate, and the copper foils having the determined printed wiring and the circular shape are left on the other face (a front face) through pattern printing, etching and rinsing process. Then, the through holes are formed at the determined positions of the copper foils, and plating treatments are conducted. First, nickel plating is given, and then, decorative gold plating (D-Au) is given. Successively, the area except the contacts 255a to 255d, and 351a to 351d are coated with a protective film through resist treatment. Thereafter, slits for defining the ID boards will be made by means of a punch or the like, and thus, an ID board sheet has been produced. In this embodiment, a thickness of the ID board sheet is set to be 0.4 mm.

Figure 21:
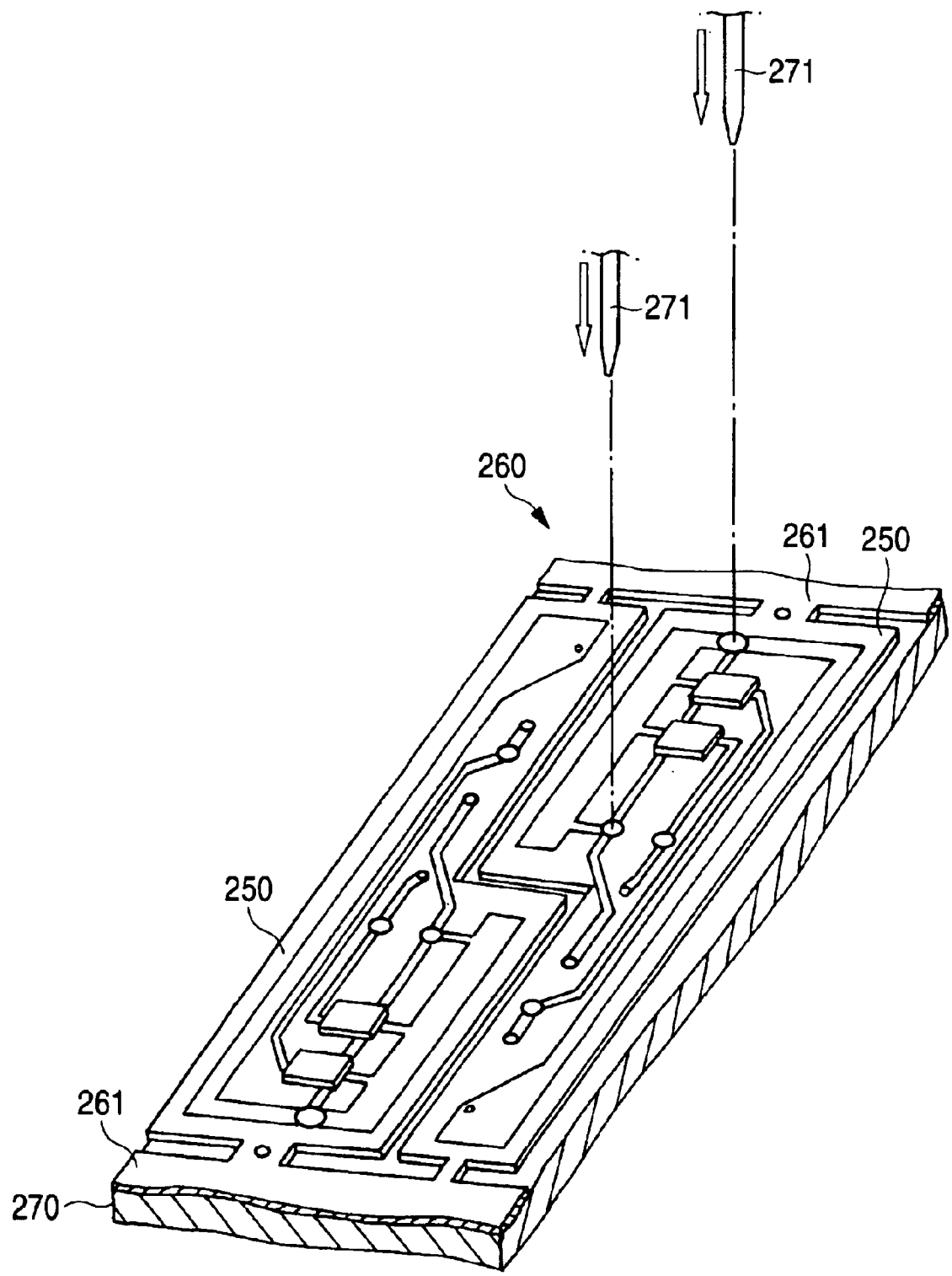
FIG. 21 is a view for explaining a method of producing the electric circuit board in the tenth embodiment.

Then, a reinforcing plate (having a thickness of 1.0 to 5.0 mm) which is a flat plate made of iron or the like having higher rigidity than plastic is bonded to a back face of the produced ID board sheet. In this case, an adhesive is applied only to the connecting members of the ID board sheet to bond the reinforcing plate to the ID board. Then, the ID board sheet having the reinforcing plate bonded to the back face will be transferred to a mounting section, and after the chip resistors 253a, 253b have been mounted on the front face of the ID board sheet, the ID board sheet will be transferred to a measuring section as shown in FIG. 21. At this moment, the reinforcing plate 270 is located at the lower face of the ID board sheet 260, and the contacts 255a to 255d are exposed on the upper face of the ID board sheet 260. In the measuring section, measuring terminals 271 are moved downward to be brought into contact with the contacts 255a to 255d, to read out a resistance value between the two determined contacts.

Figure 22:
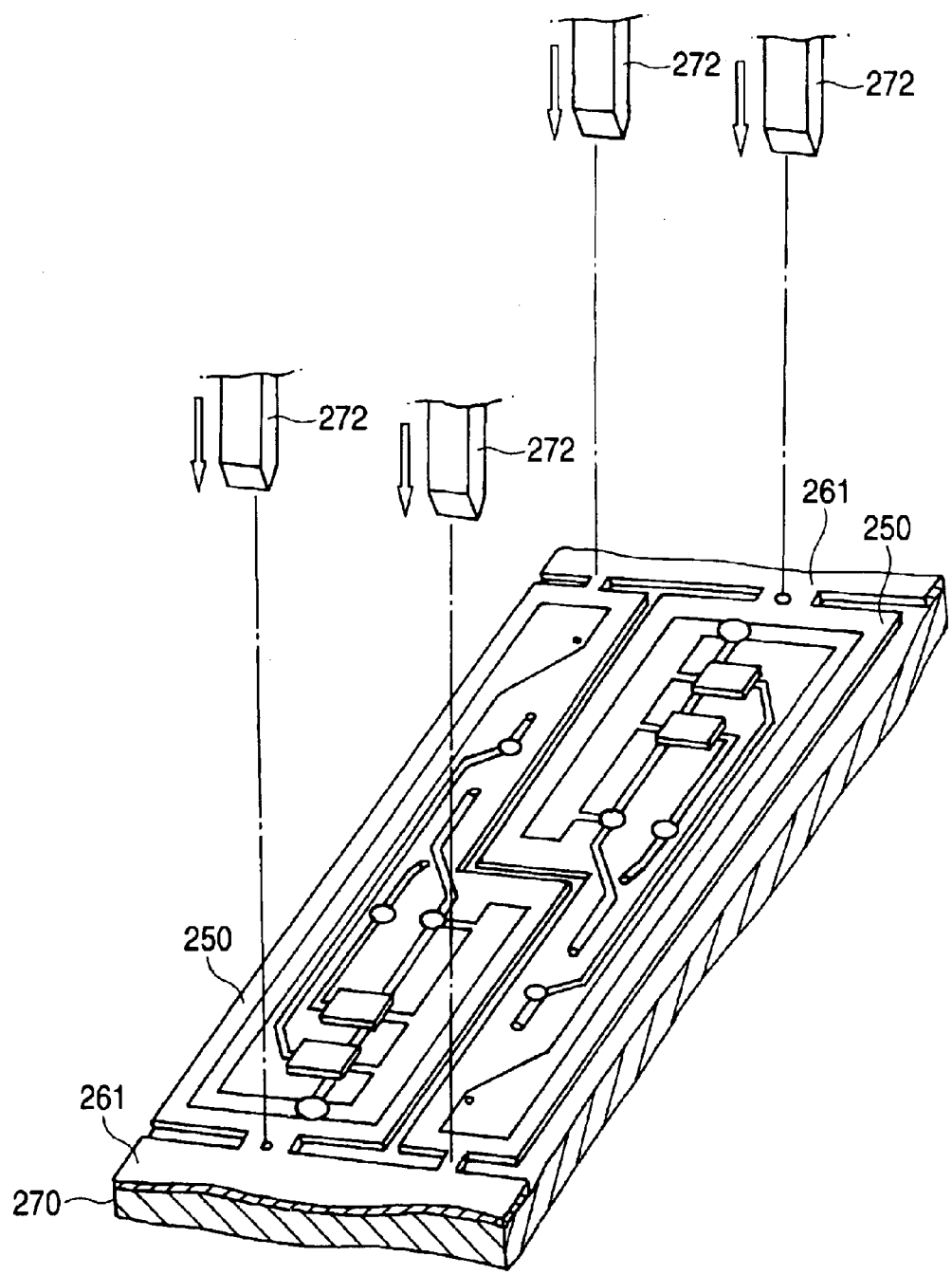
FIG. 22 is a view for explaining a method of producing the electric circuit board in the tenth embodiment.
Figure 23:
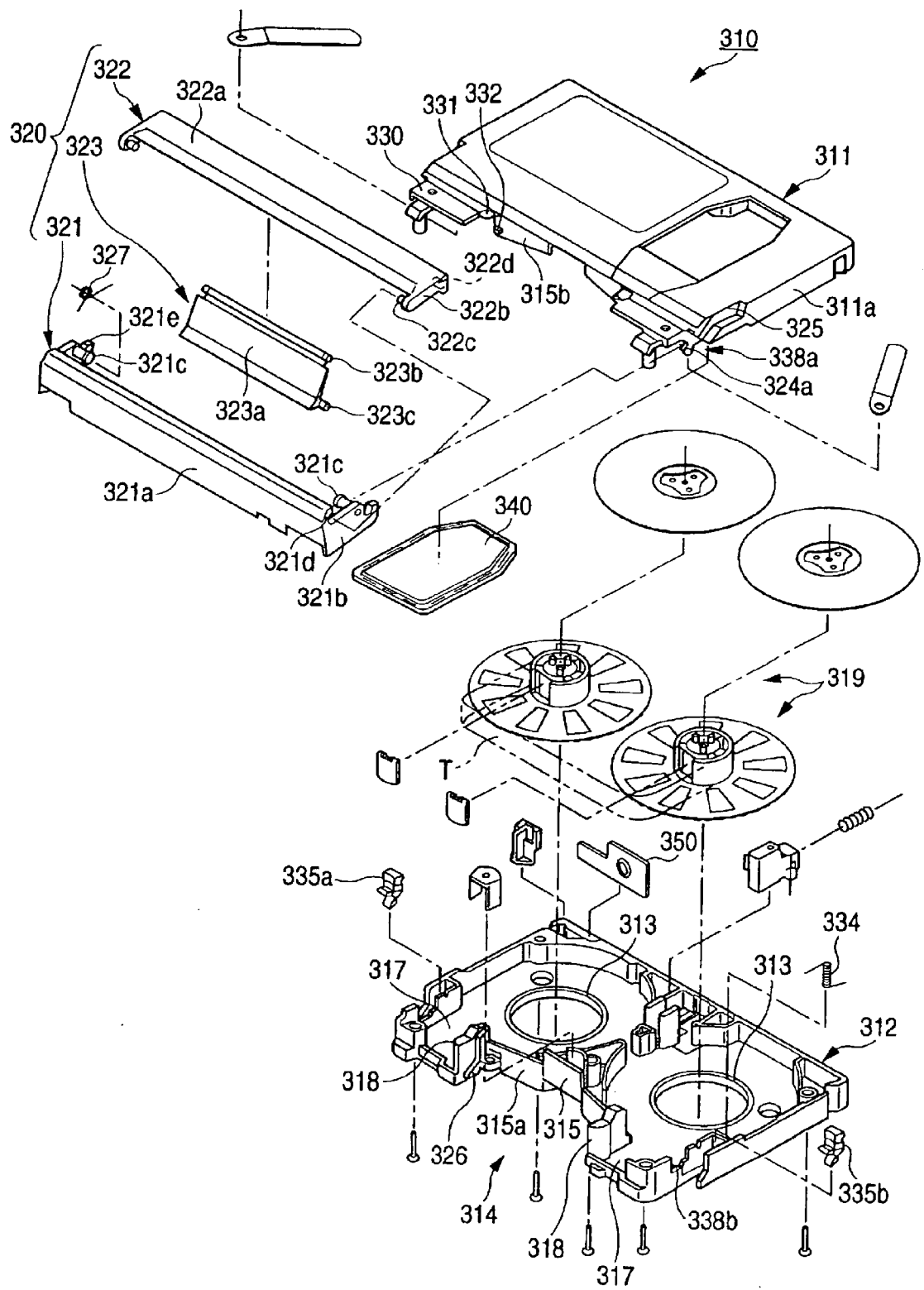
FIG. 23 is an exploded perspective view showing a DVD of an M type provided with a lid of three panel type.
Figure 24:
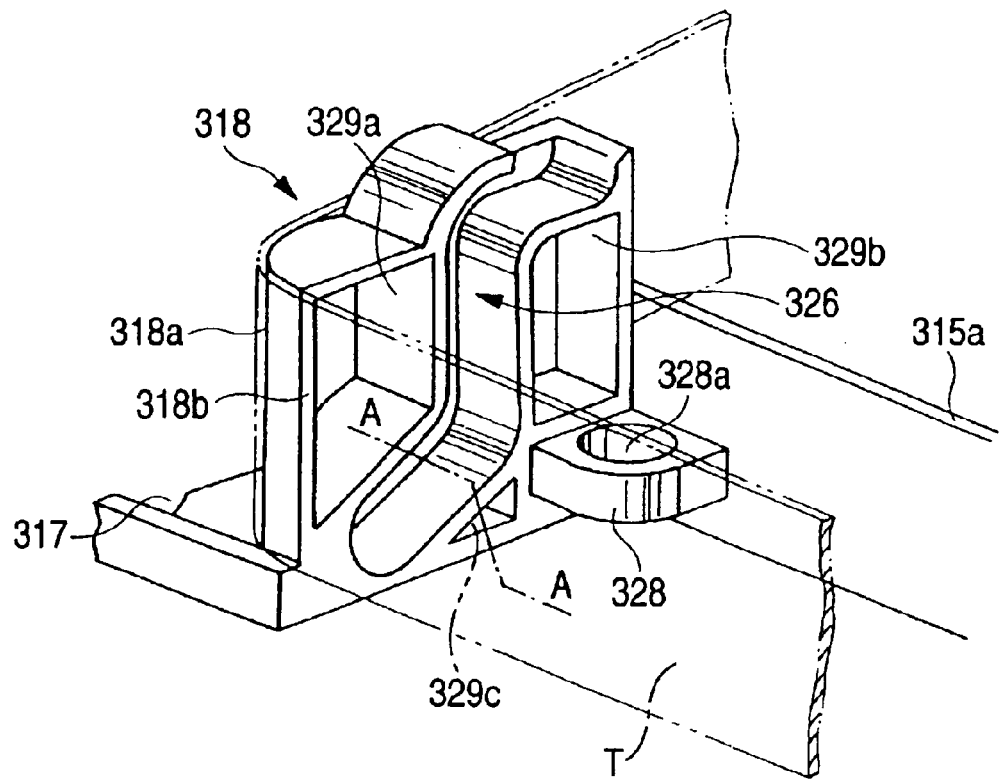
FIG. 24 is a perspective view showing a conventional tape guide.
Figure 25:
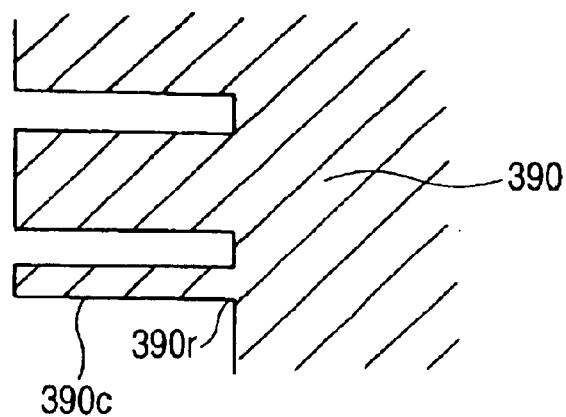
FIG. 25 is a sectional view showing a mold for injection molding of a part including a line A—A in FIG. 24.
Figure 26:
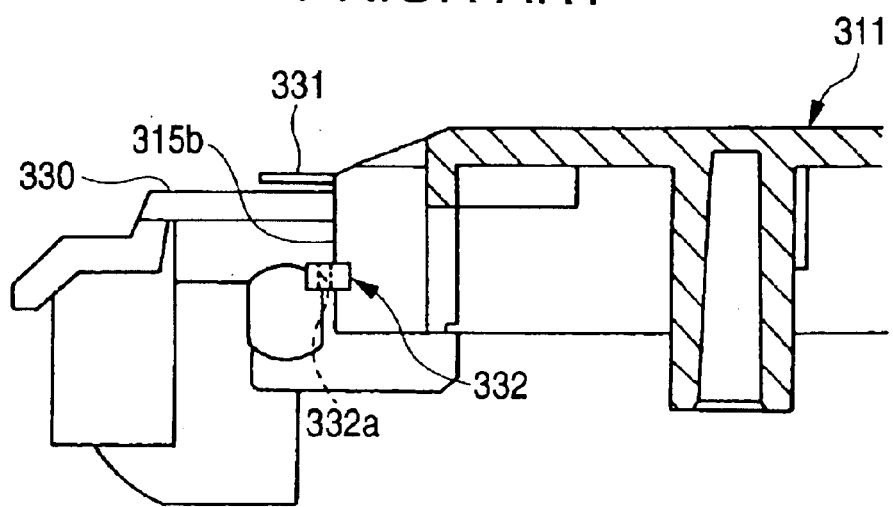
FIGS. 26(a) and 26(b) are sectional views of an upper cassette half in the conventional magnetic tape cassette.
Figure 26:
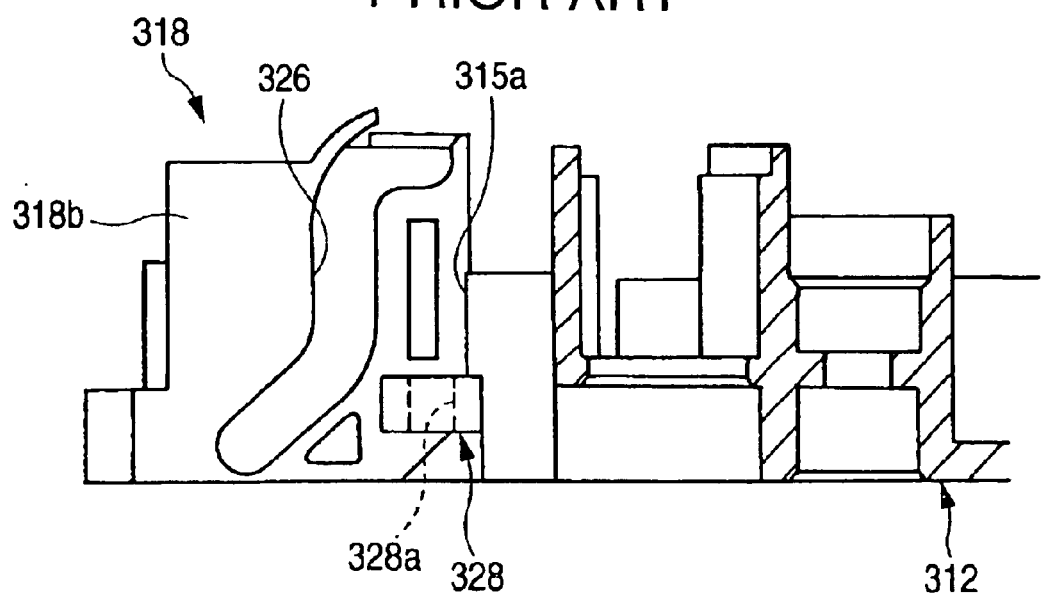
Figure 27:
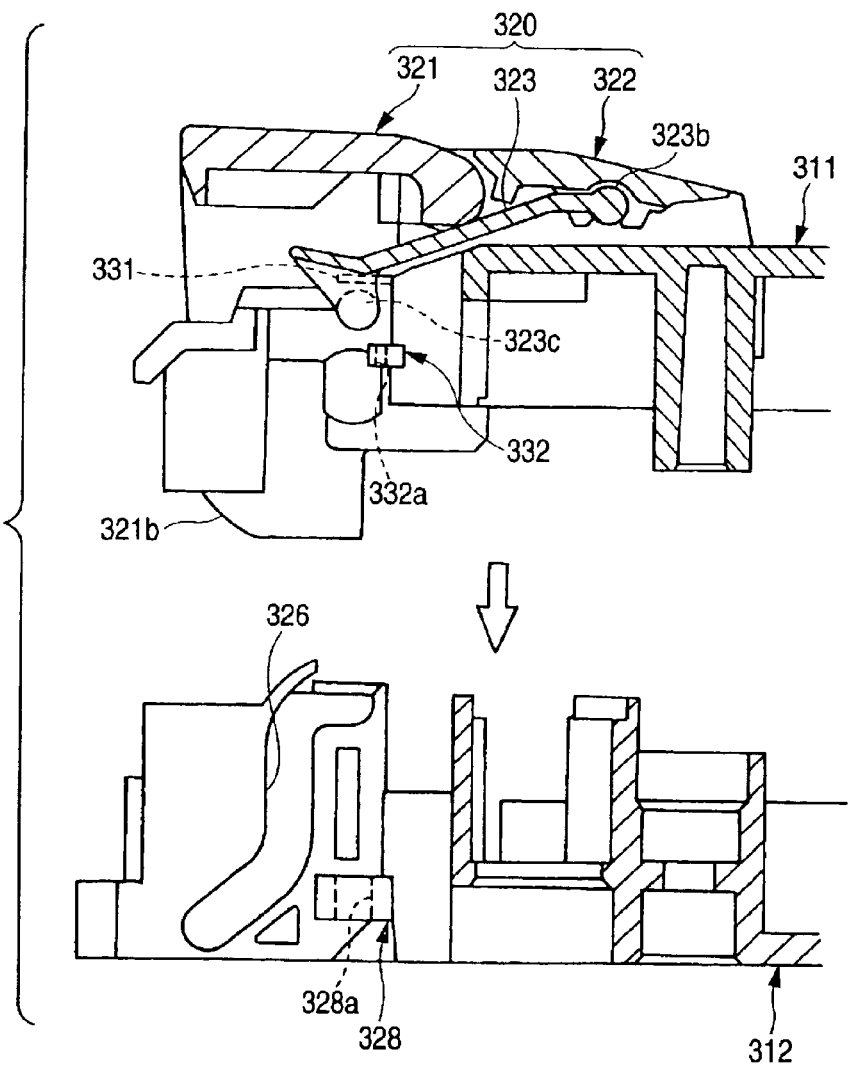
FIG. 27 is a view for explaining assembling steps of the conventional magnetic tape cassette.
Figure 28:
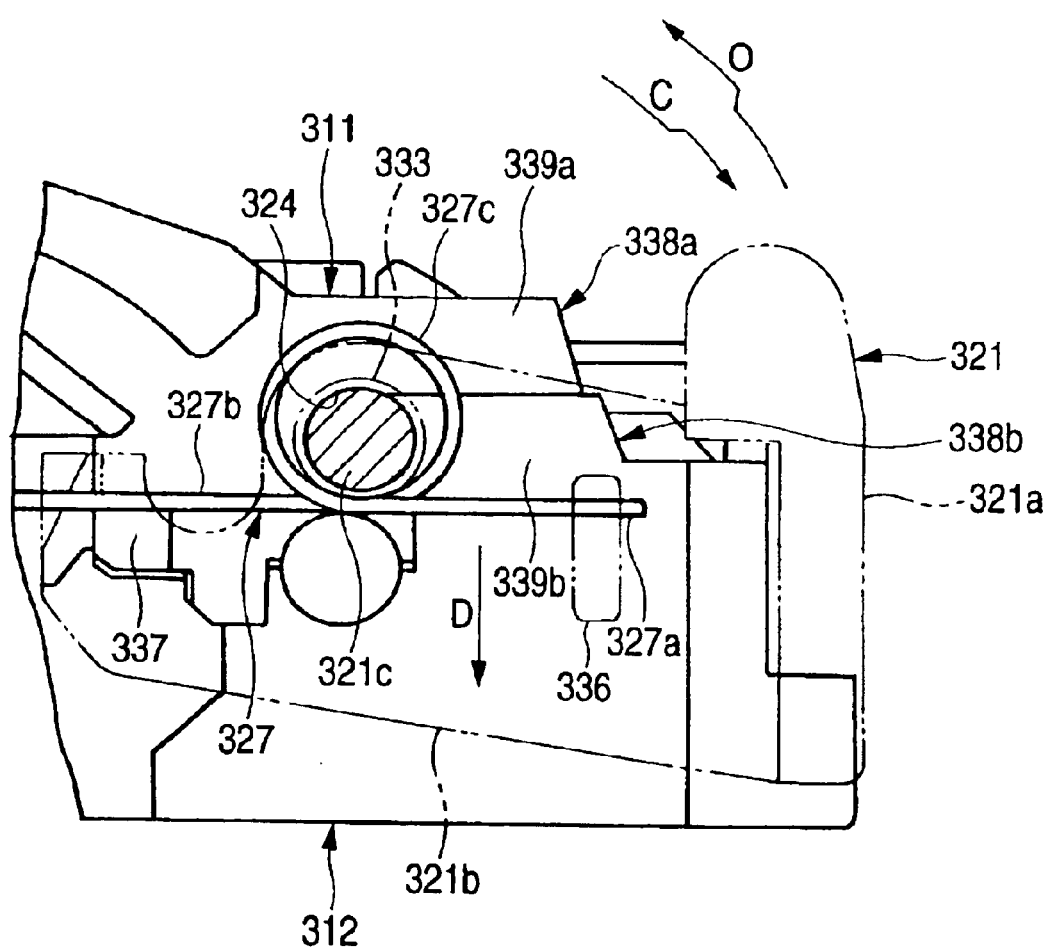
FIG. 28 is a side view of an essential part of the conventional magnetic tape cassette.
Figure 29:
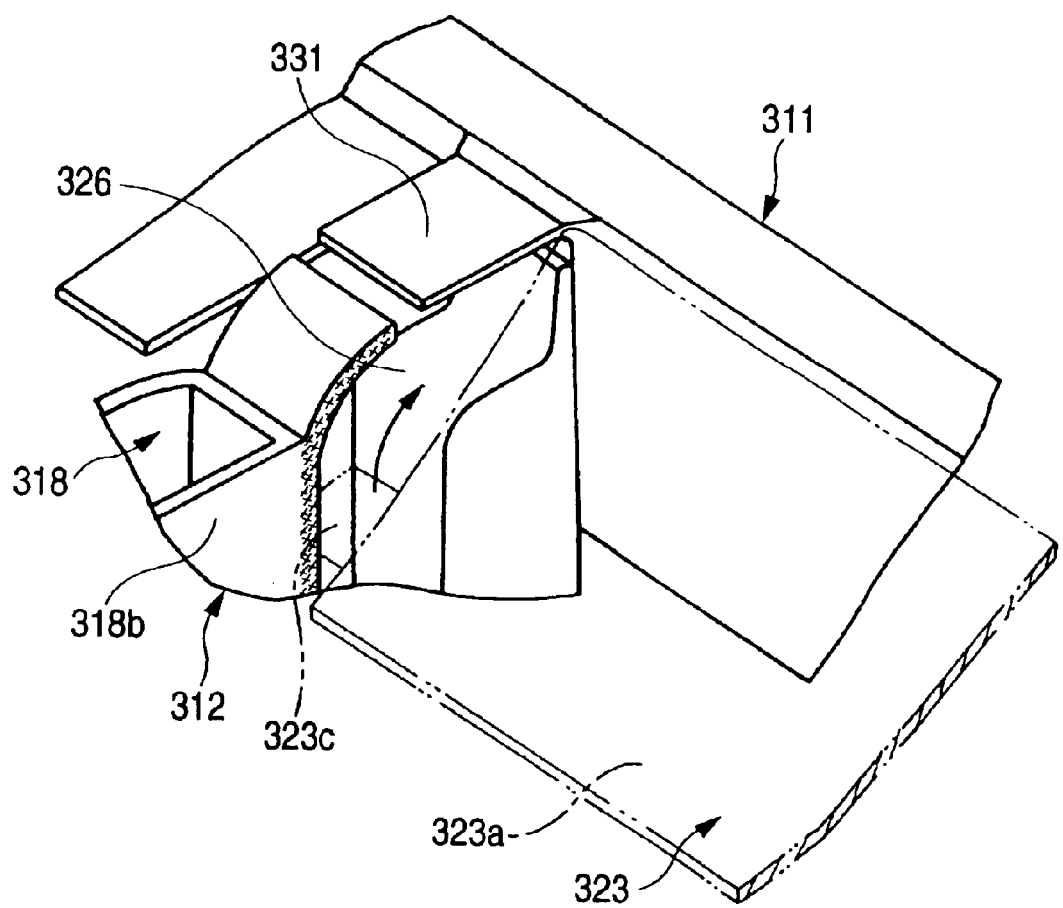
FIG. 29 is a view showing a structure around a cam groove for an inner lid in the conventional magnetic tape cassette.
Figure 30:
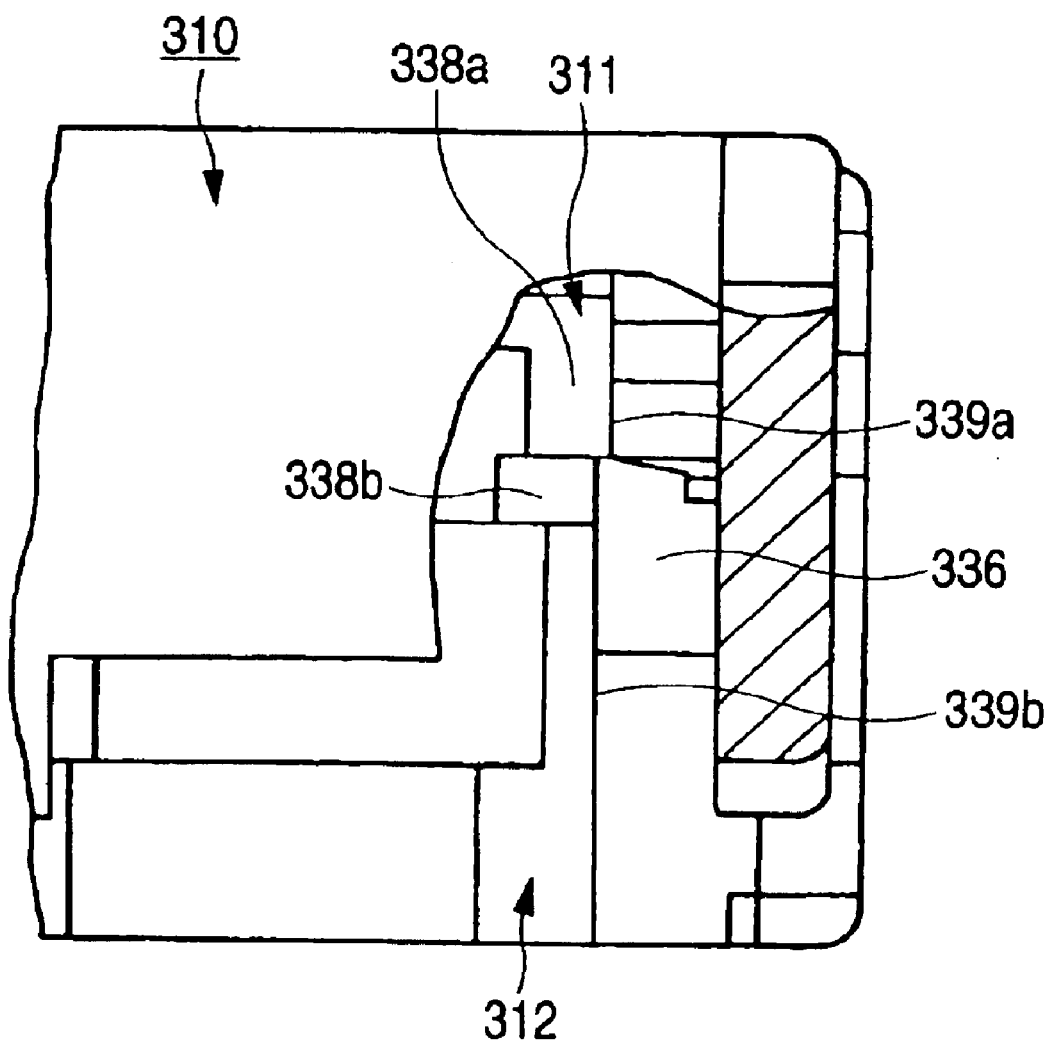
FIG. 30 is a front view of the conventional magnetic tape cassette.
Figure 31:
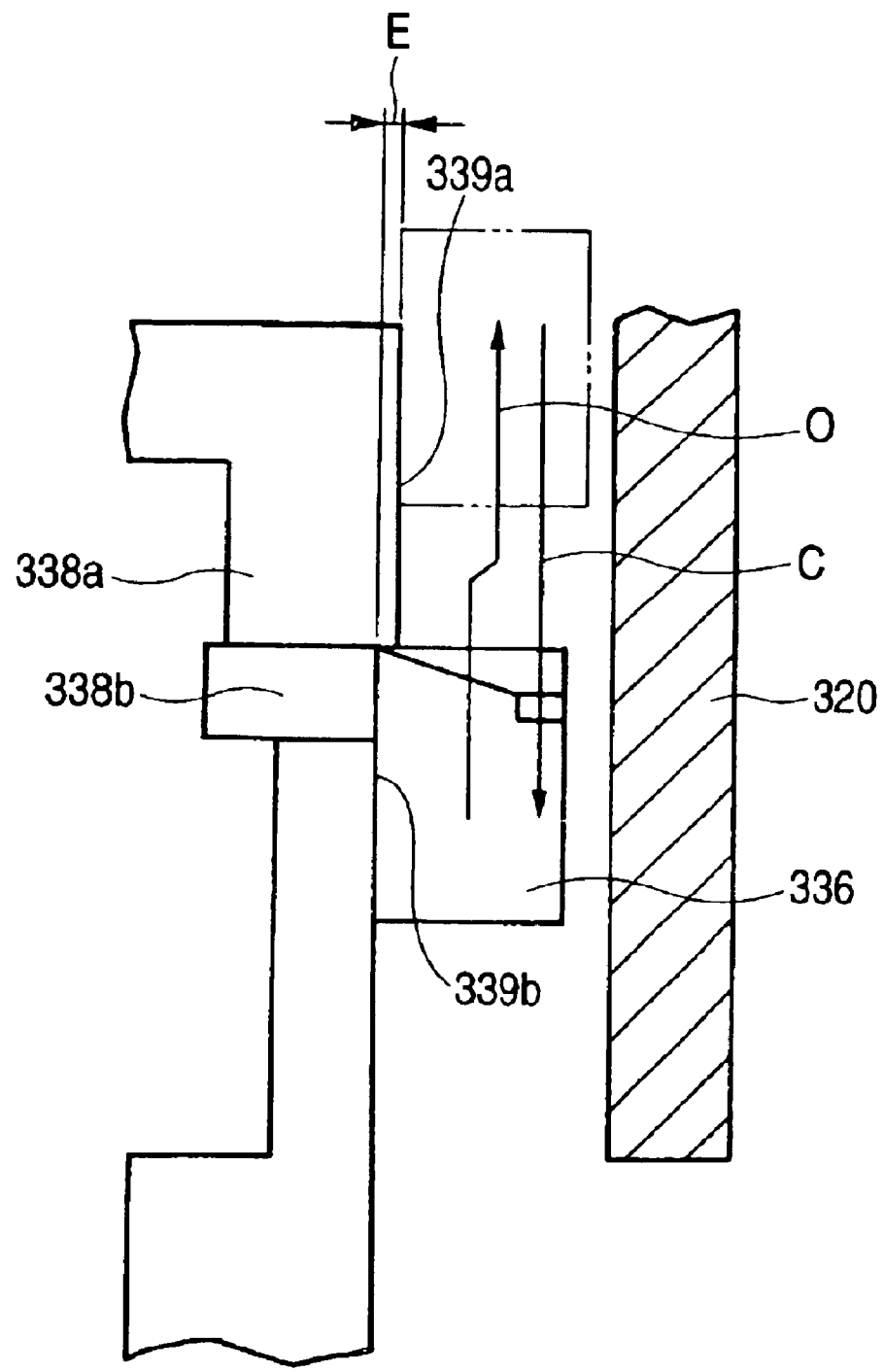
FIG. 31 is a view for explaining operation of an open/close lid of the conventional magnetic tape cassette.
Figure 32:
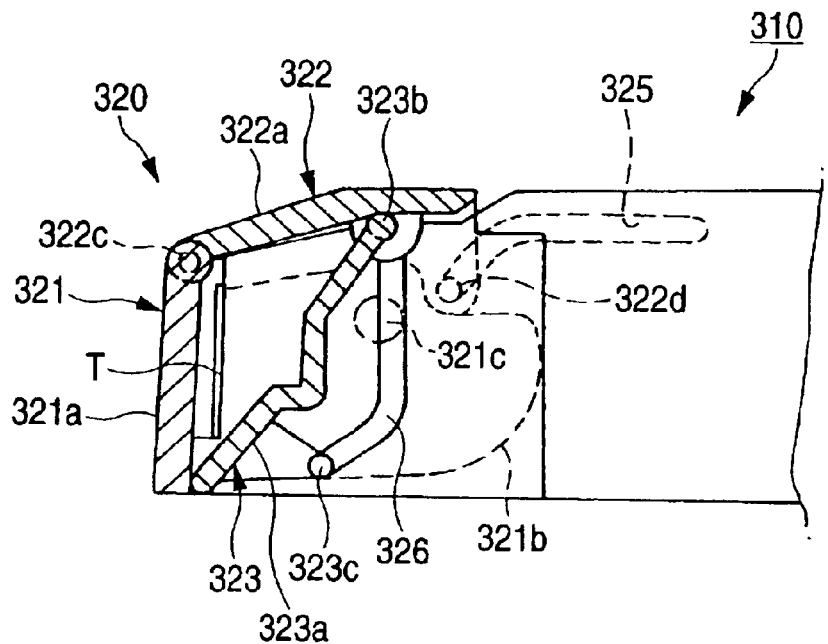
FIG. 32 is a sectional view of an essential part of the conventional magnetic tape cassette.
Figure 33:
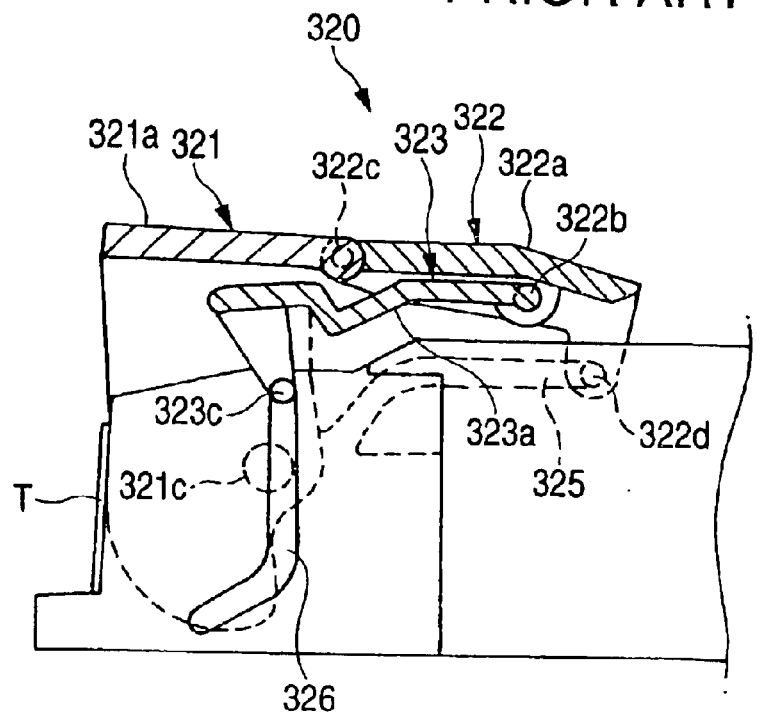
FIG. 33 is a sectional view of an essential part of the conventional magnetic tape cassette.

Then, the ID board sheet 260 will be transferred to a press section as shown in FIG. 22. The press section is provided with cutting edges 272 and a support table. In the press section, the cutting edges 272 are moved downward to cut off the ID boards 250 from the connecting members 261. On this occasion, because the reinforcing plate has been bonded to the connecting members 261 only, the ID boards 250 which have been cut off can be easily removed from the reinforcing plate. The ID boards 250 are produced through the above described steps.

According to the ID board 250 described above, in the process of taking out the ID boards 250 from the ID board sheet 260, the contact 255a to 255d which are the second contact parts are exposed from the upper face of the ID board sheet 260, when the ID board sheet 260 provided with the chip resistors 253a, 253b on the front face thereof has been transferred to the measuring section.

Therefore, the measuring terminals 271 can be easily brought into contact with the contact 255a to 255d, and thus a mechanism for supporting the ID board sheet 260 in the measuring section can be simplified.

In addition, because the ID board sheet 260 can be prevented from being warped by the use of the reinforcing plate 270, the ID board sheet 260 can be made large-sized. As the results, productivity of the ID board can be enhanced.

Further, since the reinforcing plate 270 has been bonded to only the connecting members 261 of the ID board sheet 260, a work for peeling the ID boards 250 from the reinforcing plate 270 after cutting in the press section will not be required.

The slim electric circuit board according to the invention is not limited to the above described embodiment, but appropriate variations and modifications can be made. For example, memory elements may be provided in place of the chip resistors. In this case, the measuring terminals in the measuring section get in touch with the contacts on the surface of the ID board to detect memory function of the memory elements. Moreover, the slim electric circuit board according to the invention may be produced for example, by employing a reinforcing plate in other shapes than the flat plate, or without employing any reinforcing plate, provided that warpage may not occur in the ID board sheet.

It is to be noted that the invention is not limited to the above described embodiments, but appropriate variations, modifications and so on can be made. For example, the invention can be applied to other types of magnetic tape cassettes than DVC. The invention may be also applied not only to the magnetic tape cassette having a lid of three panel type, but also to a magnetic tape cassette having the lid of two panel type.

Although the invention has been described referring to the several embodiments and variations, it is apparent that the invention also includes combinations of at least two of these embodiments and variations.

What is claimed is:

1. A magnetic tape cassette comprising:

a cassette case comprising of upper and lower cassette halves and provided with an opening at a front side; and an open/close lid for covering a magnetic tape stretched at said opening, said open/close lid including, an inner lid adapted to cover a back face of said magnetic tape, slide pins projected from both ends of a lower edge of said inner lid being slidably engaged with cam grooves for said inner lid formed in said lower cassette half, wherein said upper cassette half comprises:

position regulating member adapted to be abutted by said slide pins in a state where said open/close lid is fully opened, wherein faces of said position regulating member to be abutted by said slide pins are located at respective positions above respective openings of said cam grooves and have a curved shade which is convex in a forward direction.

2. The magnetic tape cassette as claimed in claim 1, wherein said faces of said position regulating member to be abutted by said slide pins are positioned forward of upper end walls of said cam grooves for said inner lid.

3. The magnetic tape cassette as claimed in claim 1 or 2, wherein each of said faces of said position regulating member to be abutted by said slide pins is positioned substantially on a same plane as a plane that is in parallel with a vertical direction of the cassette case and includes a center line of a position detecting hole provided in said lower cassette half.

4. The magnetic tape cassette as claimed in claim 1 or 2, wherein said faces of said position regulating member to be abutted by said slide pins are provided on a front wall of said upper cassette half.

5. The magnetic tape cassette as claimed in claim 4, wherein said front wall of said upper cassette half is provided with concave parts including curved faces, at least one part of each curved faces having a substantially same curvature as an outer peripheral face of said slide pin.

6. The magnetic tape cassette as claimed in claim 4, wherein said cam grooves for said inner lid are formed in tape guides arranged at both sides of said opening, end parts of a front wall of said upper cassette half adjacent to said tape guides are positioned backward of said faces to be abutted by said slide pins, thereby to form step-shaped differences between said end parts and said faces to be abutted by said slide pins, and back faces of said tape guides are positioned forward of said end parts and backward of said faces to be abutted by said slide pins.

7. The magnetic tape cassette as claimed in claim 6, wherein a boundary face of each of said step-shaped differences is inclined toward a center of said opening in a downward direction.

* * * * *